United States Patent
Horikawa et al.

[11] Patent Number: 6,067,120
[45] Date of Patent: May 23, 2000

[54] VIDEO SIGNAL CONVERSION DEVICE FOR REDUCING FLICKER IN NON-INTERLACED TO INTERLACED SIGNAL CONVERSION

[75] Inventors: Koji Horikawa, Nara; Hideaki Kawamura, Yamatotakada; Masayuki Ezawa, Yamatokoriyama, all of Japan

[73] Assignee: Sharp Kabushiki Kaisha, Osaka, Japan

[21] Appl. No.: 09/140,458

[22] Filed: Aug. 26, 1998

[30] Foreign Application Priority Data

Aug. 27, 1997 [JP] Japan ................................. 9-231514

[51] Int. Cl.[7] ....................................... H04N 7/01
[52] U.S. Cl. .................... 348/447; 348/910; 348/624; 348/446
[58] Field of Search .................... 348/624, 607, 348/446, 447, 910, 571

[56] References Cited

U.S. PATENT DOCUMENTS

| | | | |
|---|---|---|---|
| 4,612,570 | 9/1986 | Nakagaki et al. | 348/624 |
| 5,241,325 | 8/1993 | Keen | 348/624 |
| 5,455,628 | 10/1995 | Bishop | 348/446 |
| 5,635,990 | 6/1997 | Yi | 348/624 |
| 5,914,753 | 6/1999 | Donovan | 348/447 |

FOREIGN PATENT DOCUMENTS 6083299  3/1994  Japan .

Primary Examiner—Andrew I. Faile

[57] ABSTRACT

A video signal conversion device of the present includes a flicker reduction section including a plurality of line buffers for storing data in accordance with an address thereof. The flicker reduction section receives non-interlaced signals, converts the non-interlaced signals to interlaced signals and performs a flicker reduction process.

15 Claims, 26 Drawing Sheets

FIG.4A
Production of odd-numbered field
Image on screen
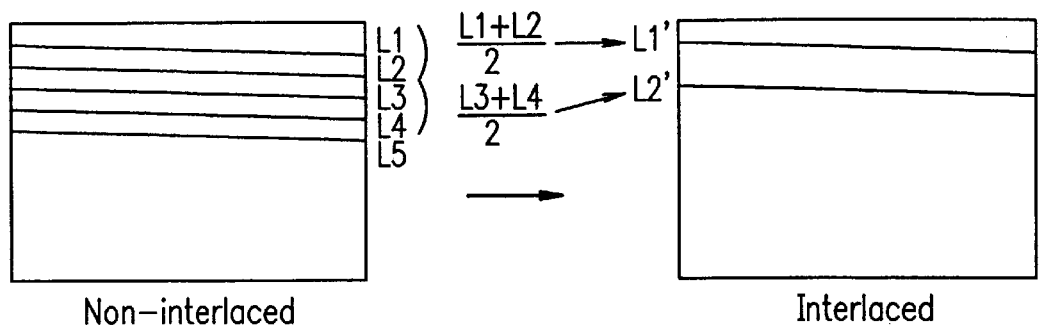
Image in signal
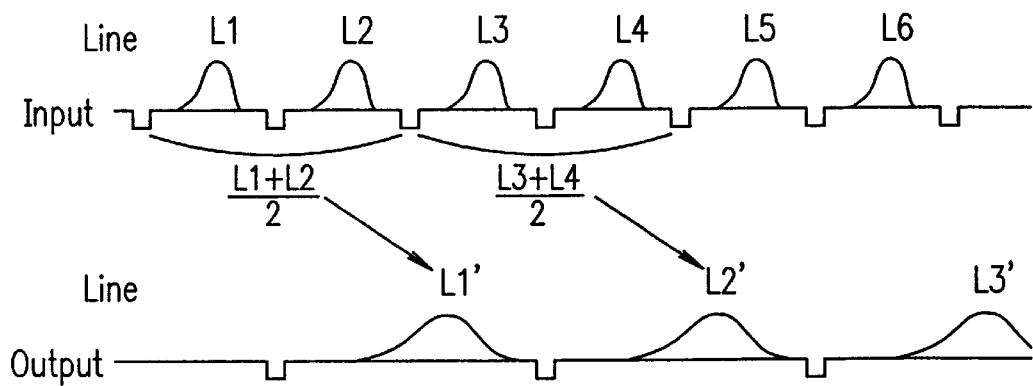

FIG. 4B
Production of even-numbered field
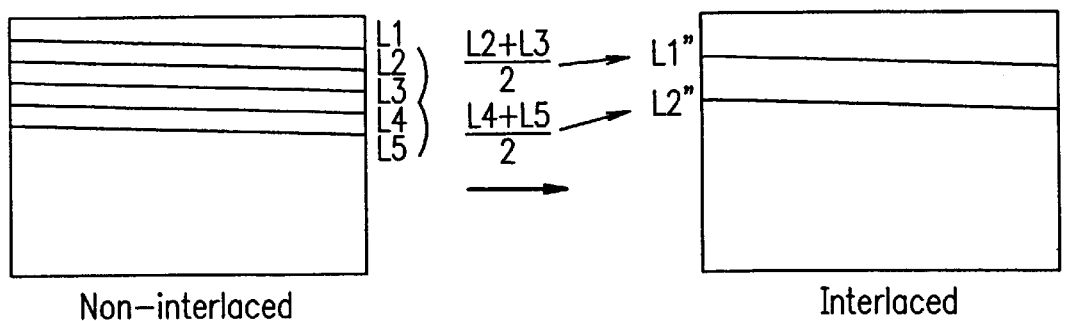
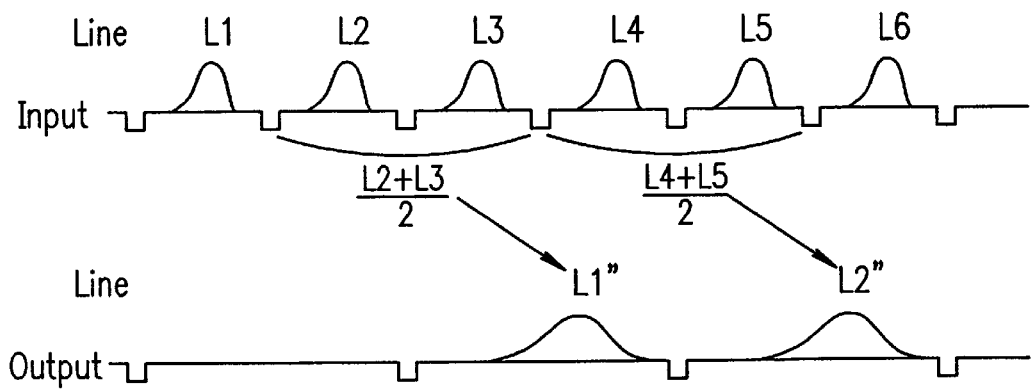

FIG. 7  Data timing diagram

FIG.12

Input to flicker reduction section 50

| Y1 | Y2 | Y3 | Y4 | Y5 | Y6 | Y7 | Y8 | Y9 | ----- |
| U1 | U2 | U3 | U4 | U5 | U6 | U7 | U8 | U9 | ----- |
| V1 | V2 | V3 | V4 | V5 | V6 | V7 | V8 | V9 | ----- |

Data as stored in line buffer 51

| Y1 | Y2 | Y3 | Y4 | Y5 | Y6 | Y7 | Y8 | Y9 | ----- |
| U1 | V1 | U3 | V3 | U5 | V5 | U7 | V7 | U9 | ----- |

Output from flicker reduction section 50

| Y1 | Y2 | Y3 | Y4 | Y5 | Y6 | Y7 | Y8 | Y9 | ----- |
| U1 | $\frac{U1+U3}{2}$ | U3 | $\frac{U3+U5}{2}$ | U5 | $\frac{U5+U7}{2}$ | U7 | $\frac{U7+U9}{2}$ | U9 | ----- |
| V1 | $\frac{V1+V3}{2}$ | V3 | $\frac{V3+V5}{2}$ | V5 | $\frac{V5+V7}{2}$ | V7 | $\frac{V7+V9}{2}$ | V9 | ----- |

Y: Luminance signal
U: First color-difference signal
V: Second color-difference signal

FIG.18A
Production of odd-numbered field
Image on screen
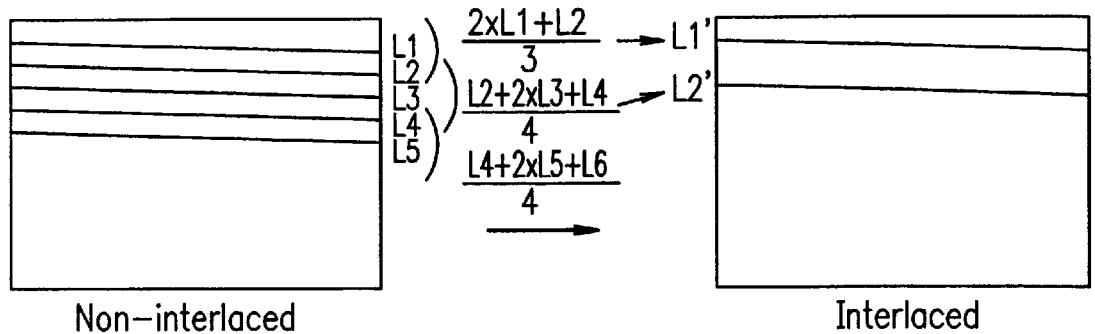
Non-interlaced          Interlaced
Image in signal
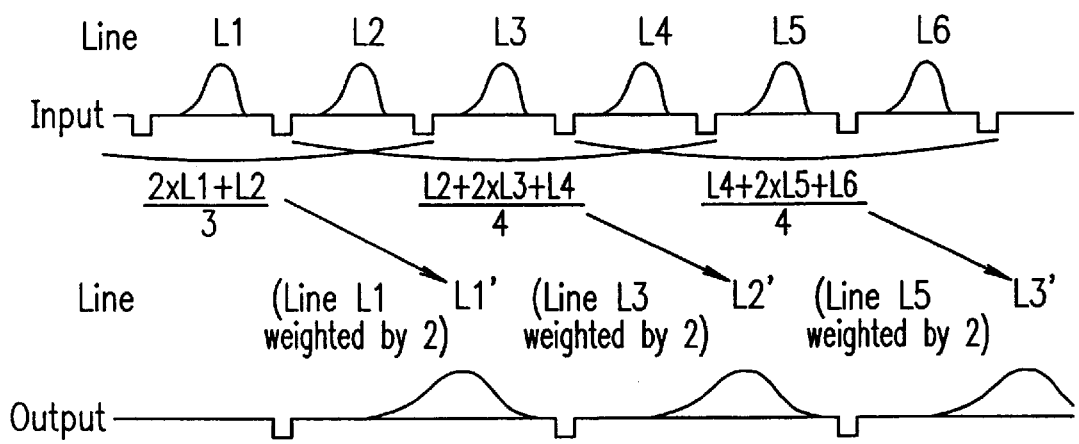

FIG.18B
Production of even-numbered field
Image on screen
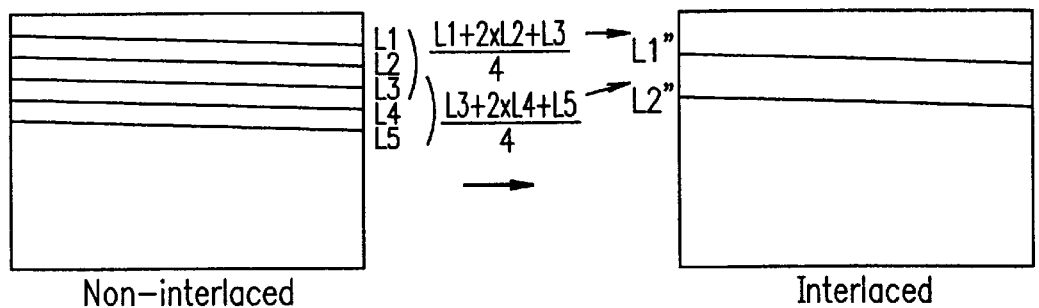
Non-interlaced     Interlaced
Image in signal
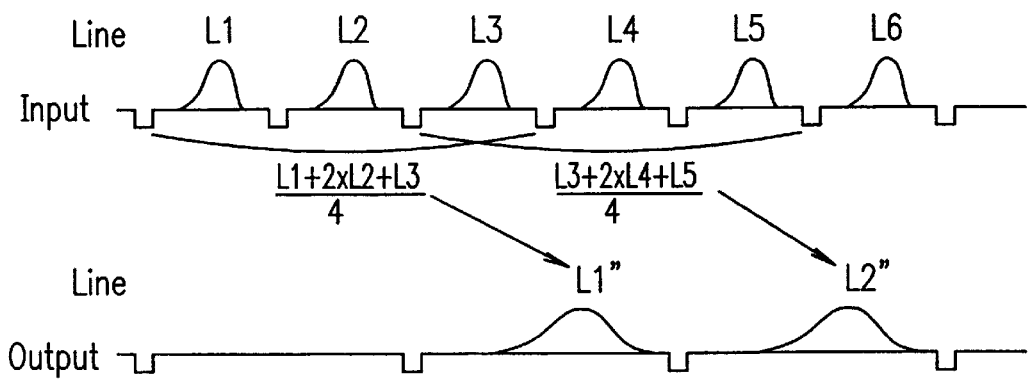

FIG.20 Data timing diagram

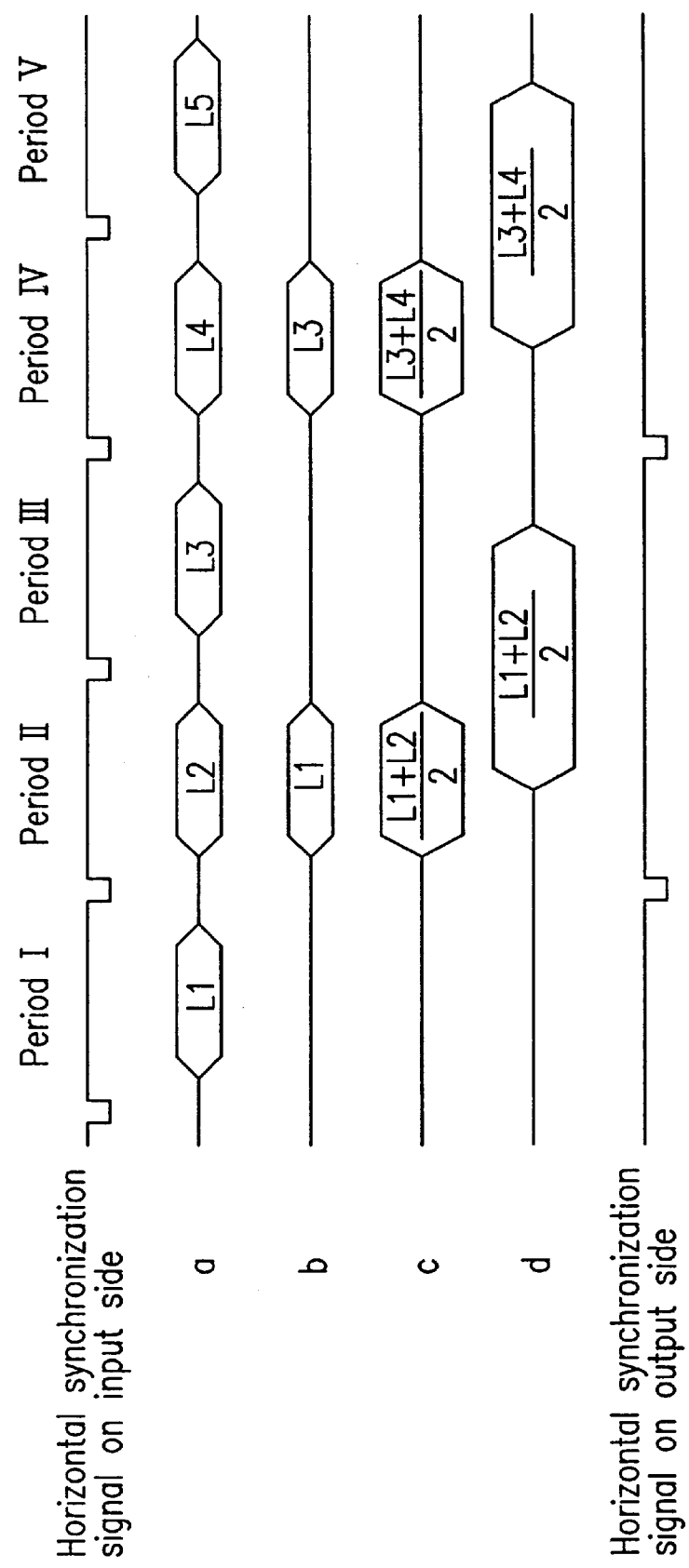
FIG.22B Data timing diagram

VIDEO SIGNAL CONVERSION DEVICE FOR REDUCING FLICKER IN NON-INTERLACED TO INTERLACED SIGNAL CONVERSION

BACKGROUND OF THE INVENTION

1. Field of the Invention

The present invention relates to a video signal conversion device. More particularly, the present invention relates to a video signal conversion device for converting a non-interlaced video signal from a computer, or the like, to an interlaced video signal for television, which minimizes the number of line buffer units required and reduces the flicker and bleeding. The bleeding refers to a noise in the form of a vertical line which is not supposed to be in the original image.

2. Description of the Related Art

A video signal output from a computer device, or the like, is a signal which is not interlaced (hereinafter, referred to as a "non-interlaced" signal). In order for a computer signal to be used for television, the computer signal has to be converted to an interlaced signal. The conversion involves a process of dividing a non-interlaced input frame into two field frames, thus requiring two memories; one for reducing by one-half the vertical resolution and another for altering the horizontal synchronization frequency.

In particular, the above-described process (the non-interlaced-to-interlaced conversion process) may be performed on RGB signals, which are then subjected to a signal conversion process, or the input RGB signals may first be converted to one luminance signal and two color-difference signals. In either case, the device has to be capable of storing three data values (i.e., one luminance signal and two color-difference signals) at a time.

A conventional video signal conversion device, as illustrated in FIG. 22A, requires three line buffer units for reducing by one-half the vertical resolution, and three other line buffer units for altering the horizontal synchronization frequency.

In non-interlaced/interlaced conversion, the cycle at which one interlaced frame is displayed is ½ the cycle at which one non-interlaced frame is displayed, whereby it is likely for a flicker noise to occur where the luminance changes greatly in the vertical direction.

Flicker is reduced typically by removing vertical high-frequency components. This is realized by multiplying several lines above and below the displayed line by appropriate weighting coefficients and averaging them. In order to perform such a process for successively-input non-interlaced signals, it is required to provide a number of line buffers for storing data values of a number of lines used in calculating an average value (the number of lines used in the averaging process is referred to as the "number of taps"). Normally, the average calculation requires a number of line buffers one less than the number of taps. Assuming that the number of taps is n, the number of line buffers required can be obtained by multiplying the number of line buffers required for the average calculation for one route by the total number of routes (e.g., 3), and by adding to the multiplication result the number (e.g., 3) of line buffers required for altering the horizontal synchronization frequency. Thus, (the number of line buffers required)=$(n-1) \times 3 + 3 = 3n$.

FIG. 22B illustrates signal timing diagrams at points a, b, c and d in the video signal conversion device of FIG. 22A. During period I, data of the first line is input and stored in the line buffer for vertical resolution conversion and flicker reduction. During period II, as data of the second line is input, the data of the first line which has been stored in the line buffer is read out, and the average value of the data of the first line and the data of the second line is calculated. The calculation result is then written in the line buffer for horizontal synchronization frequency conversion. During periods II and III, the calculation result is read out in synchronization with the horizontal synchronization frequency on the output side, which is ½ the frequency provided on the input side.

Japanese Laid-open Publication No. 6-83299 discloses a 3-tap scan conversion circuit, which is illustrated in FIG. 23.

For a 3-tap scan conversion circuit which performs a flicker reduction process, the line buffers for vertical resolution conversion and flicker reduction are not separate from the line buffers used for horizontal synchronization frequency conversion. Still, the scan conversion circuit requires $3 \times 3 = 9$ line buffers.

As described above, the conventional non-interlaced/interlaced conversion requires 3n line buffers for performing an n-tap flicker reduction process. For example, the video signal conversion device illustrated in FIG. 22A must have 6 line buffers for performing a 2-tap flicker reduction process. As the number of memories increase, the size (and thus the cost and power consumption) of the video signal conversion device increases accordingly.

SUMMARY OF THE INVENTION

According to one aspect of this invention, a video signal conversion device includes a flicker reduction section including a plurality of line buffers for storing data in accordance with an address thereof. The flicker reduction section receives non-interlaced signals, converts the non-interlaced signals to interlaced signals and performs a flicker reduction process.

In one embodiment of the invention, at least one of the line buffers includes an input port for inputting data and two output ports for outputting data. The line buffer is capable of storing a data value in accordance with an address thereof and, independently, reading out two data values corresponding to two addresses.

In one embodiment of the invention, the non-interlaced signals comprise RGB signals.

In one embodiment of the invention, the non-interlaced signals comprise a luminance signal, a first color-difference signal and a second color-difference signal.

In one embodiment of the invention, the video signal conversion device further includes a signal conversion section for converting RGB signals to a luminance signal, a first color-difference signal and a second color-difference signal. The flicker reduction section receives the luminance signal, the first color-difference signal and the second color-difference signal output from the signal conversion section.

In one embodiment of the invention, the flicker reduction section includes a color-difference signal compression and decompression section for compressing and decompressing the first color-difference signal and the second color-difference signal.

In one embodiment of the invention, the color-difference signal compression and decompression section thins out the first color-difference signal by removing alternating data values of the first color-difference signal arranged serially in a time domain and outputting the remaining data values of the first color-difference signal to one of the line buffers, and thins out the second color-difference signal by removing alternating data values of the second color-difference signal arranged serially in a time domain and outputting the remaining data values of the second color-difference signal to the one of the line buffers, thereby compressing the first and second color-difference signals. The color-difference signal compression and decompression section decompresses the compressed color-difference signal by linearly interpolating the removed data values using the remaining data values.

In one embodiment of the invention, the video signal conversion device further includes a color noise reduction section for reducing bleeding.

In one embodiment of the invention, the flicker reduction process is performed by addition and averaging.

In one embodiment of the invention, the video signal conversion device further includes a control section for controlling a writing of data in the line buffer and for controlling a reading out of data stored in the line buffer.

In one embodiment of the invention, the non-interlaced signals comprise RGB signals. The flicker reduction section converts the non-interlaced RGB signals to interlaced RGB signals. The video signal conversion device further comprises a signal conversion section for converting the RGB signals output from the flicker reduction section to a luminance signal, a first color-difference signal and a second color-difference signal.

In one embodiment of the invention, the RGB signals comprise signals output from a computer.

In one embodiment of the invention, the non-interlaced signal includes first data of a first line and second data of a second line. The line buffer calculates an average value of the first data and the second data.

In one embodiment of the invention, the non-interlaced signal includes first data of a first line and second data of a second line. The line buffer calculates a weighted average value of the first data and the second data.

In one embodiment of the invention, the non-interlaced signal includes first data of a first line, second data of a second line and third data of a third line. The line buffer calculates an average value of the first data, the second data and the third data.

In one embodiment of the invention, the non-interlaced signal includes first data of a first line, second data of a second line and third data of a third line. The line buffer calculates a weighted average value of the first data, the second data and the third data.

As described above the video signal conversion device of the present invention is provided with a flicker reduction section, having a line buffer, for converting the non-interlaced signal to an interlaced signal and for performing a flicker reduction process. The line buffer includes one input port for inputting data and two output ports for outputting data. The line buffer is capable of storing a data value in accordance with the address thereof and, independently, reading out two data values corresponding to two addresses. When it is possible to write a data value in one address while simultaneously reading out data values from two addresses, the line buffer can be shared in the non-interlaced/interlaced conversion process and in the flicker reduction process, thereby reducing the number of memories required for these processes.

In another video signal conversion device of the present invention, a line buffer is used in non-interlaced/interlaced conversion and in flicker reduction, thereby reducing the number of memories required for these processes.

The flicker reduction section is provided in a stage subsequent to the signal conversion section, and has a color-difference signal compression/decompression section for compressing/decompressing the color-difference signal. Since a human eye is less sensitive to a color difference than it is to luminance, the color-difference signal compression/decompression section can perform a data thinning process for reducing by one-half the amount of color-difference data. Thus, it is possible to first compress by one-half the color-difference signal before storing the signal in the line buffer. Therefore, it is possible, for example, to provide only one line buffer where two line buffers would otherwise be required, thereby reducing the number of memories.

The color-difference signal compression/decompression section compresses the two color-difference signals by thinning them out (i.e., by removing every other one of the data values of each color-difference signal arranged serially in the time domain). In decompression, linear interpolation is used to restore each removed data value of each color-difference signal, thereby obtaining a signal which is very close to the original, uncompressed color-difference signals.

Thus, the invention described herein makes possible the advantage of providing a video signal conversion device for performing non-interlaced/interlaced conversion while reducing flicker, and in which the number of line buffers which occupy the major area of the device is minimized.

This and other advantages of the present invention will become apparent to those skilled in the art upon reading and understanding the following detailed description with reference to the accompanying figures.

BRIEF DESCRIPTION OF THE DRAWINGS

FIG. 4A is a diagram illustrating an exemplary process for simultaneously performing non-interlaced/interlaced conversion and flicker reduction in an odd-numbered field;

FIG. 4B is a diagram illustrating an exemplary process for simultaneously performing non-interlaced/interlaced conversion and flicker reduction in an even-numbered field;

FIG. 12 illustrates compression and decompression of a color-difference signal according to the present invention;

FIG. 18A is a diagram illustrating an exemplary process for simultaneously performing non-interlaced/interlaced conversion and flicker reduction in an odd-numbered field;

FIG. 18B is a diagram illustrating an exemplary process for simultaneously performing non-interlaced/interlaced conversion and flicker reduction in an even-numbered field;

FIG. 22B illustrates signal timing diagrams at points a, b, c, and d in the line buffer unit of FIG. 22A.

DESCRIPTION OF THE PREFERRED EMBODIMENTS

Hereinafter, the present invention will be described by way of illustrative examples with reference to the accompanying figures.

EXAMPLE 1

Figure 1:
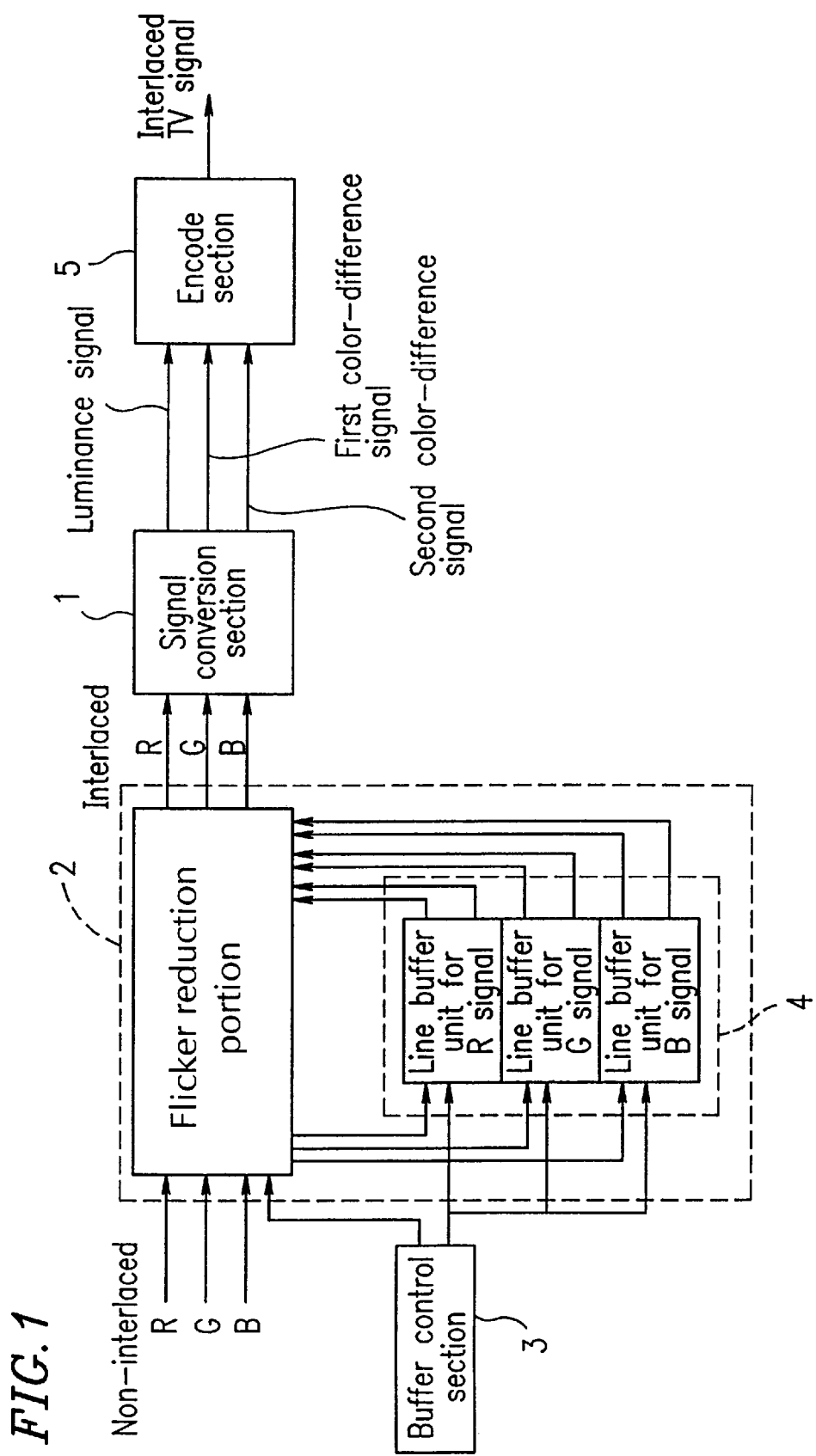
FIG. 1 is a diagram illustrating a configuration of a video signal conversion device according to Example 1 of the present invention.

FIG. 1 is a diagram illustrating a configuration of a video signal conversion device according to Example 1 of the present invention. The video signal conversion device illustrated in FIG. 1 includes a signal conversion section 1, a flicker reduction section 2 having a line buffer section 4, a buffer control section 3 and an encode section 5.

Non-interlaced signals (including R, G and B signals) output from a computer device, or the like, are input to the flicker reduction section 2. The horizontal synchronization frequency of the non-interlaced signal is about 31.46 KHz. This is twice as high as that of an interlaced signal.

The non-interlaced signal includes a horizontal synchronization signal, a vertical synchronization signal and a pixel signal. The image data is transferred by successively transferring image data signals of the displayed image, based on the vertical synchronization signal. For example, the image data signal is transferred from the uppermost scanning line to the lowermost scanning line.

The flicker reduction section 2 receives non-interlaced signals (e.g., R, G and B signals). The flicker reduction section 2 performs a non-interlaced/interlaced conversion process for converting a non-interlaced signal to an interlaced signal and also performs a flicker reduction process.

The signal conversion section 1 converts the R, G and B signals output from the flicker reduction section 2 to a luminance signal and first and second color-difference signals.

Figure 2:
FIG. 2 is a diagram illustrating a line buffer unit illustrated in FIG. 1.

The buffer section 3 controls the line buffer section 4 when the flicker reduction section 2 performs the non-interlaced/interlaced conversion process and the flicker reduction process. The line buffer section 4 includes three line buffer units as illustrated in FIG. 2. Each line buffer unit as illustrated in FIG. 2 has an input port and first and second output ports. The line buffer unit is capable of simultaneously writing a data value in one address and reading out data values corresponding to two addresses. The three line buffer units respectively receive R, G and B signals. The writing/reading of data to/from the line buffer section 4 is based on a control signal from the buffer control section 3.

The encode section 5 converts the luminance signal and the first and second color-difference signals to a luminance signal and a chromaticity signal for television, or to decoded video signals, thereby producing interlaced signals as required.

Figure 3:
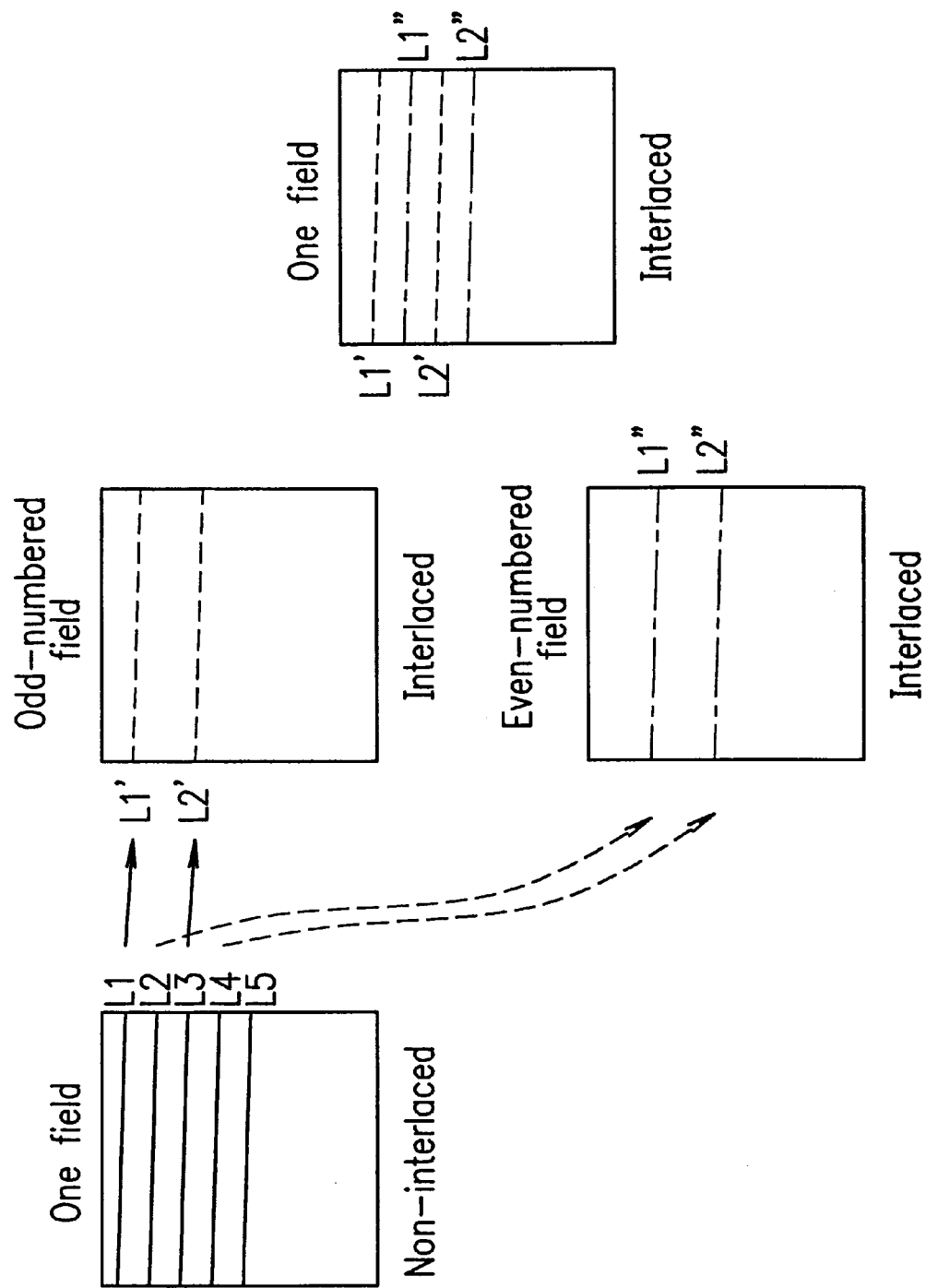
FIG. 3 is a diagram illustrating the non-interlaced mode and the interlaced mode.

FIG. 3 illustrates an exemplary process of converting a non-interlaced image to an interlaced image. In the non-interlaced mode, all lines L1, L2, L3, L4, L5, . . . , are displayed sequentially. On the other hand, in the interlaced mode, one field of image is composed of an odd-numbered field and an even-numbered field. The odd-numbered field and the even-numbered field each have a number of lines that is ½ the total number of lines in one field of image (non-interlaced). The odd-numbered fields and the even-numbered fields are alternately displayed. In the odd-numbered field, only the odd-numbered lines (designated as L1', L2', etc.) of the non-interlaced image are displayed, while, in an even-numbered field, only the even-numbered lines (designated as L1", L2", etc.) are displayed. Although the odd-numbered fields and the even-numbered fields are displayed in an alternating fashion, not simultaneously, a human eye recognizes an odd-numbered field and an even-numbered field as a single image, in part due to an afterimage phenomenon.

However, the alternate display of the odd-numbered and even-numbered fields causes a flicker noise.

Moreover, signals output from a computer device, or the like, are in the non-interlaced mode and each of the scanning lines may have different image data. Particularly, if a signal including a rapid luminance change in the vertical direction of the screen is converted to an interlaced signal, the odd-numbered field or the even-numbered field may be considerably brighter than the other.

When a relatively bright field and a relatively dark field are alternately displayed, a human eye may detect a flicker noise. The flicker noise can be reduced by reducing the luminance difference between the two adjacent lines in a non-interlaced field.

When converting a non-interlaced signal to an interlaced signal, it is necessary to perform a process of reducing by one-half the horizontal synchronization frequency and number of lines in the field. In the interlaced mode, the update frequency at which one field of image is updated is ½ that in the non-interlaced mode. Moreover, in the interlaced mode, the rate at which one line is drawn is set to be ½ that in the non-interlaced mode. Therefore, when converting a non-interlaced signal to an interlaced signal, it is necessary to convert the horizontal synchronization frequency.

FIGS. 4A and 4B illustrate an exemplary process for simultaneously performing non-interlaced/interlaced conversion and flicker reduction. While a line buffer is used in these processes, the same line buffer is used in the process of converting the horizontal synchronization frequency.

Hereinafter, the flicker reduction process will be described with reference to FIGS. 4A and 4B.

The following process is performed for producing an odd-numbered field. Data of the first line L1 (i.e., data representing the first vertical line) of the non-interlaced input signal is input to and stored in a line buffer. Next, data of the second line L2 of the non-interlaced input signal is input to another line buffer. Then, the average value of the data of the first line L1 and the data of the second line L2 is calculated. The average value is output as the first line L1' of the odd-numbered field of an interlaced output signal. Data of the third line L3 of the non-interlaced input signal is then input to, and stored in, a line buffer. Next, data of the fourth line L4 of the non-interlaced input signal is input to another line buffer. Then, the average value of the data of the third line L3 and the data of the fourth line L4 is calculated. The average value is output as the second line L2' of the odd-numbered field of the interlaced output signal. This process is repeated for the fifth and sixth lines L5 and L6, and subsequent lines, of the non-interlaced input signal, respectively.

The following process is performed for producing an even-numbered field. Data of the second line L2 of the non-interlaced input signal is input to, and stored in, a line buffer. Next, data of the third line L3 of the non-interlaced input signal is input to another line buffer. Then, the average value of the data of the second line L2 and the data of the third line L3 is calculated. The average value is output as the first line L1" of the even-numbered field of an interlaced output signal. Data of the forth line L4 of the non-interlaced input signal is input to, and stored in, a line buffer. Next, data of the fifth line L5 of the non-interlaced input signal is input to another line buffer. Then, the average value of the data of the fourth line L4 and the data of the fifth line L5 is calculated. The average value is output as the second line L2" of the even-numbered field of the interlaced output signal. This process is repeated for the sixth and seventh lines L6 and L7, and the subsequent lines, of the non-interlaced input signal, respectively.

In this way, each adjacent line pair in a non-interlaced field is averaged. Thus, the number of lines in one field is reduced by one-half, while also reducing the luminance difference therebetween and thus the flicker noise.

Regarding the horizontal synchronization frequency conversion, the frequency of the non-interlaced input signal is divided in half and used as the clock of the interlaced output signal. The data after the flicker reduction process, i.e., the averaged data, is synchronized with the produced clock and is read out from the line buffer, thereby converting the horizontal synchronization frequency.

Figure 5:
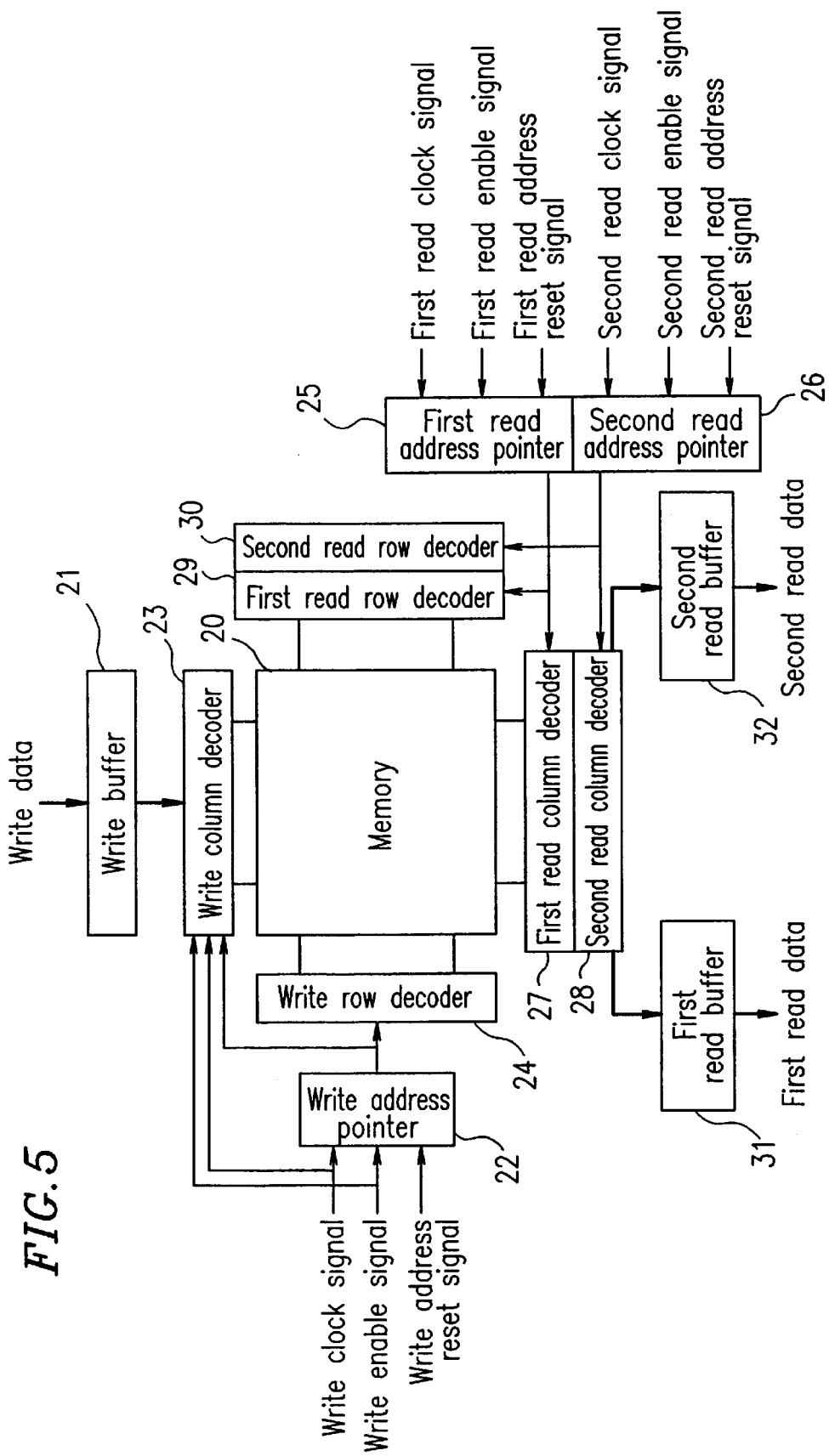
FIG. 5 is a detailed diagram illustrating a line buffer configuration.

Hereinafter, an exemplary detailed configuration of the line buffer section 2 which is suitably used in the above-described process will be described with reference to FIG. 5. FIG. 5 illustrates a portion of the flicker reduction section, namely the line buffer section 4 having a FIFO (First In First Out) arrangement.

The flicker reduction section 2 includes a memory 20, a write buffer 21, a write address pointer 22, a write column decoder 23, a write row decoder 24, a first read address pointer 25, a second read address pointer 26, a first read column decoder 27, a second read column decoder 28, a first read row decoder 29, a second read row decoder 30, a first read buffer 31 and a second read buffer 32.

The write address pointer 22, the first read address pointer 25 and the second read address pointer 26 are reset. In particular, the pointers 22, 25 and 26 are reset when their respective reset signals are activated. It is noted that each of the pointers 22, 25 and 26 may be reset independently of the others.

When a write enable signal is active, write data is written, in synchronization with the write clock, to an address in the memory 20 designated by the write address pointer 22. When this write operation is completed, the address is updated.

When the first read enable signal is active, first read data is read out, in synchronization with the first read clock, from an address in the memory 20 designated by the first read address pointer 25. Data corresponding to the address in the memory 20 designated by the first read address pointer 25 is read out from the first read buffer 31.

When the second read enable signal is active, second read data is read out, in synchronization with the second read clock, from an address in the memory 20 designated by the second read address pointer 26. Data corresponding to the address in the memory 20 designated by the second read address pointer 26 is also read out from the second read buffer 32. The operation of reading out the first read data and the operation of reading out the second read data are performed independently of each other. Moreover, the operations of reading out the first and second read data are performed independently of the operation of writing write data to the memory 20.

Hereinafter, the non-interlaced/interlaced conversion and the flicker reduction process of the present invention, performed by using the same line buffer unit, will be described with reference to FIGS. 6 and 7.

Figure 6:
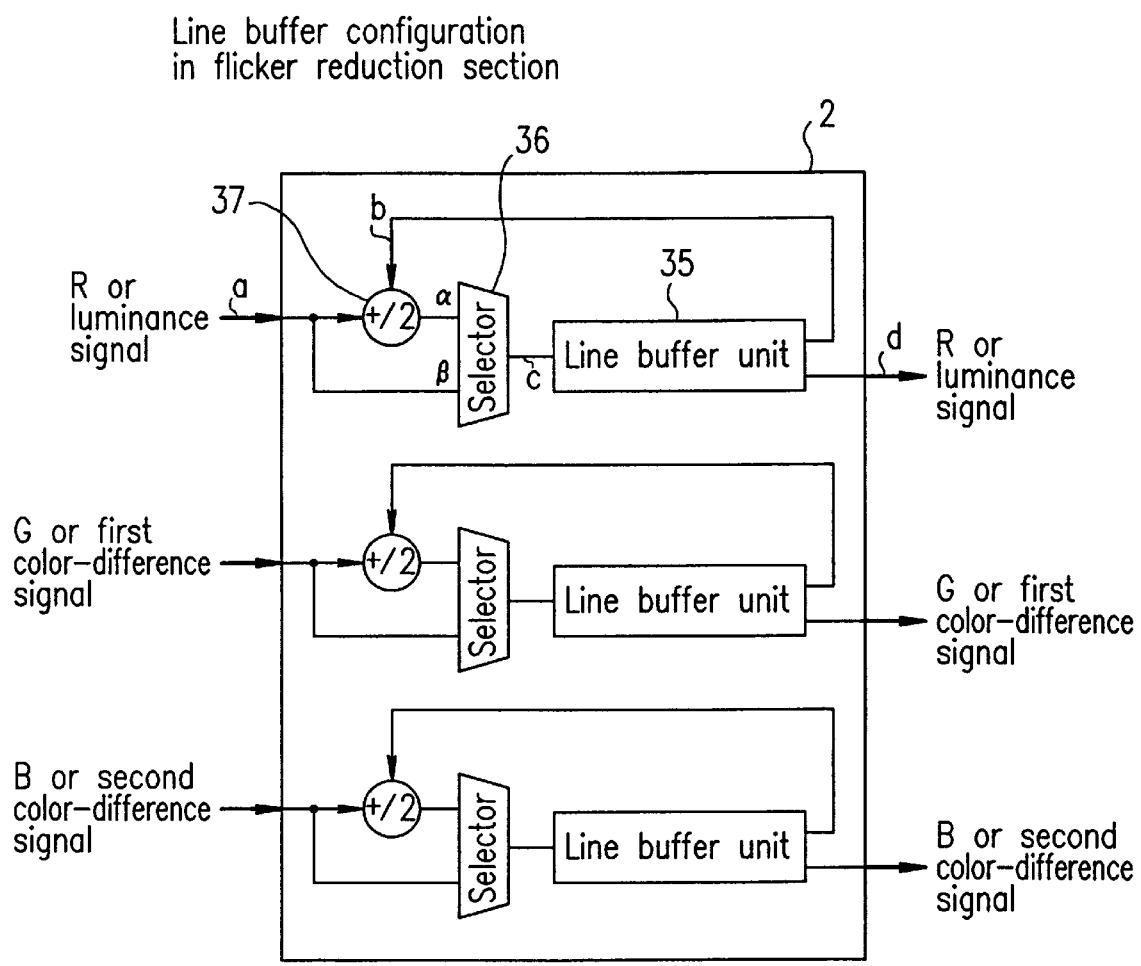
FIG. 6 is a diagram illustrating a line buffer unit configuration used in the present invention.

FIG. 6 illustrates an example of the flicker reduction section 2, as illustrated in FIG. 1. The flicker reduction section 2 of FIG. 6 includes a line buffer unit 35, a selector 36 electrically connected to the line buffer unit 35 and an arithmetic unit 37 for calculating the average value of the input signals. The line buffer unit 35 includes an input port for inputting data and two output ports for outputting data. The line buffer unit 35 is capable of storing a data value in accordance with an address thereof. It is further capable of reading out two data values corresponding to two addresses thereof in such a manner that the storing and reading can be made independently. FIG. 7 illustrates signal timing diagrams at points a, b, c and d in the flicker reduction section 2.

During period I, the data of the first line L1 of the non-interlaced input signal is written in the line buffer unit 35 in synchronization with the horizontal synchronization signal on the input side. In this case, the selector 36 selects a signal from port β so that the data of the first line L1 is written in the line buffer unit 35.

During period II, the data of the second line L2 of the non-interlaced input signal is input in synchronization with the horizontal synchronization signal on the input side. The arithmetic unit 37 calculates the average value of the data of the second line L2 and the data of the first line L1, which has been written in the line buffer unit 35. The average value is then written into the line buffer unit 35 in synchronization with the horizontal synchronization signal on the input side. In this case, the selector 36 selects a signal from port α so that the average of the data input to the flicker reduction section 2 and the data which has been written in the line buffer unit 35 is written in the line buffer unit 35.

Then, during periods II and III, the averaged data written in the line buffer unit 35 is output in synchronization with the horizontal synchronization signal of the output side of the flicker reduction section 2, which has been obtained by dividing in half the frequency of the horizontal synchronization signal on the input side of the flicker reduction section 2. The data written in the line buffer unit 35 is output at a time before the data of the third line L3 of the non-interlaced input signal is written in the line buffer unit 35. In this way the flicker reduction section performs the non-interlaced/ interlaced conversion process and the flicker reduction process.

Figure 7:
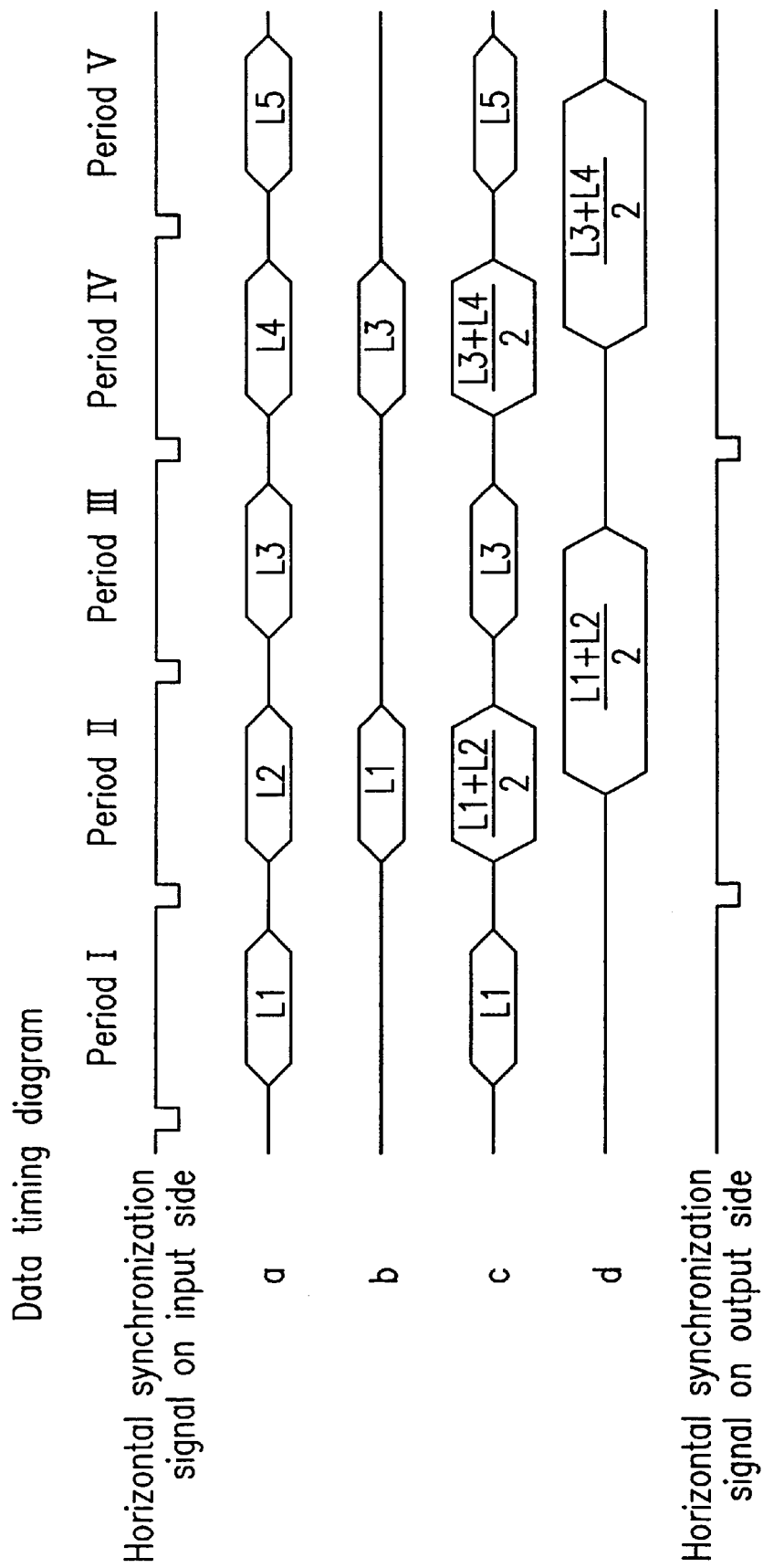
FIG. 7 illustrates signal timing diagrams at points a, b, c and d in the flicker reduction section of FIG. 6.
Figure 8:
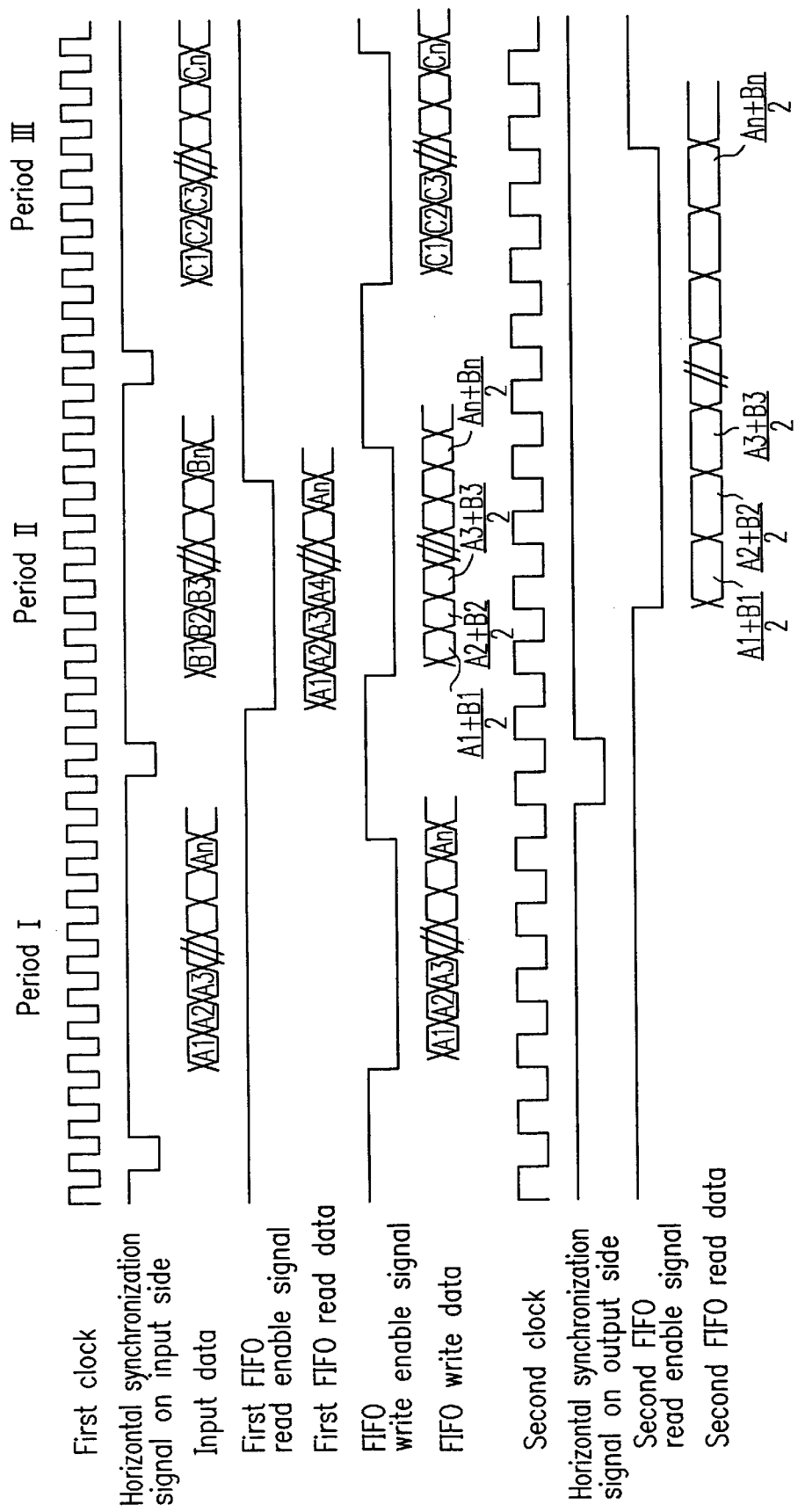
FIG. 8 illustrates detailed versions of the signal timing diagrams of FIG. 7.

FIG. 8 is a detailed diagram of the timing diagram illustrated in FIG. 7. The first clock signal is produced based on the horizontal synchronization signal on the input side of the flicker reduction section 2. The second clock signal is produced based on the horizontal synchronization signal on the output side of the flicker reduction section 2.

During period I, when a first FIFO read enable signal is active, data values A1, A2, A3, . . . , An of the first line L1 of the non-interlaced input signal are written in a line buffer unit in synchronization with the first clock signal.

During period II, when a first FIFO read enable signal is active, the data values A1, A2, A3, . . . , An of the first line L1, which have been written in the line buffer unit 35 of FIG. 6, are read out in synchronization with the first clock signal. Data values B1, B2, B3, . . . , Bn of the second line L2 of the non-interlaced input signal also are input in synchronization with the first clock signal. The respective average values of data B1, B2, B3, . . . , Bn of the second line L2 and the data values A1, A2, A3, . . . , An of the first line L1 are calculated by the arithmetic unit 37. When the FIFO write enable signal is active, the averaged values (A1+B1)/2, (A2+B2)/2, (A3+B3)/2, . . . , (An+Bn)/2 are written in the line buffer unit 35 in synchronization with the first clock signal (the horizontal synchronization signal on the input side of the flicker reduction section 2).

Then, when a second FIFO read enable signal is active, the averaged values (A1+B1)/2, (A2+B2)/2, (A3+B3)/2, . . . , (An+Bn)/2 are output in synchronization with the second clock signal (the horizontal synchronization signal on the input side of the flicker reduction section 2).

During period II, at a time one cycle after the data Ax stored in the line buffer unit 35 is read out, the average value of the data Ax and data Bx ((Ax+Bx)/2) is written in the line buffer unit 35.

Data which has not been updated is never read out since the second clock signal has a frequency that is ½ that of the first clock signal. Moreover, since there is a blanking period between periods II and III, the average value (An+Bn)/2 has been completely output before data Cn is written in period III. Thus, new data is never written in the line buffer unit 35 before the averaged value is read out.

Although a 2-tap video signal conversion device has been described above, the video signal conversion device of the present invention is not limited thereto. The same effects as described above can still be realized when k (k is a natural number equal to or greater than 3) taps are provided.

Figure 9:
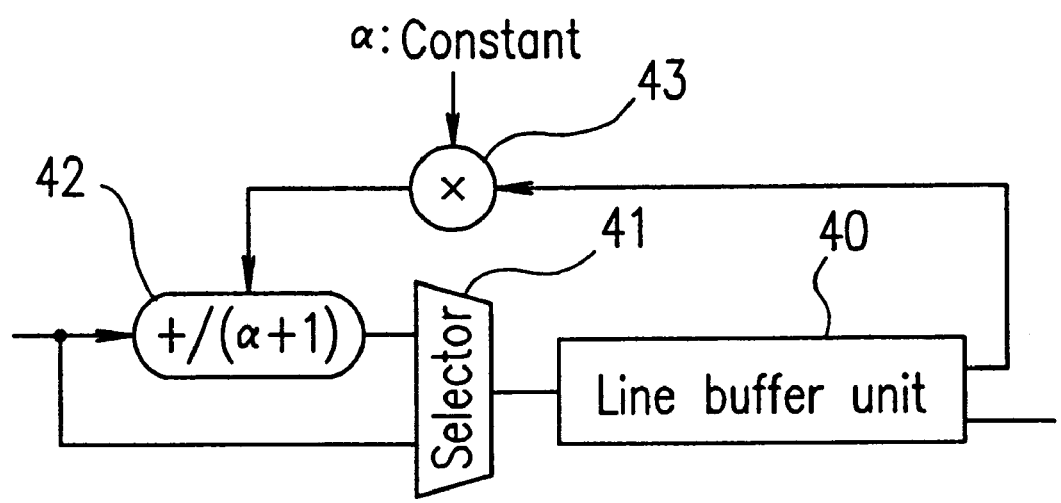
FIG. 9 is a diagram illustrating a line buffer unit configuration of the present invention.

FIG. 9 illustrates a portion of another flicker reduction section according to Example 1 of the present invention. The circuit illustrated in FIG. 9 allows the flicker reduction rate and the vertical resolution to be adjusted.

The circuit of FIG. 9 includes a line buffer unit 40, a selector 41, an arithmetic unit 42 and a multiplier 43.

Data of α $j^{th}$ line is written in the line buffer unit 40. The first data is then read out from the line buffer unit 40, and is multiplied by a predetermined value α by the multiplier 43. Then, data of α $j+1^{th}$ line is added to the first data by the arithmetic unit 42. Moreover, the resultant value is divided by the value (α+1), and then is written in the line buffer unit 40. By varying the value α, it is possible to adjust the flicker reduction rate and the vertical resolution.

Figure 10:
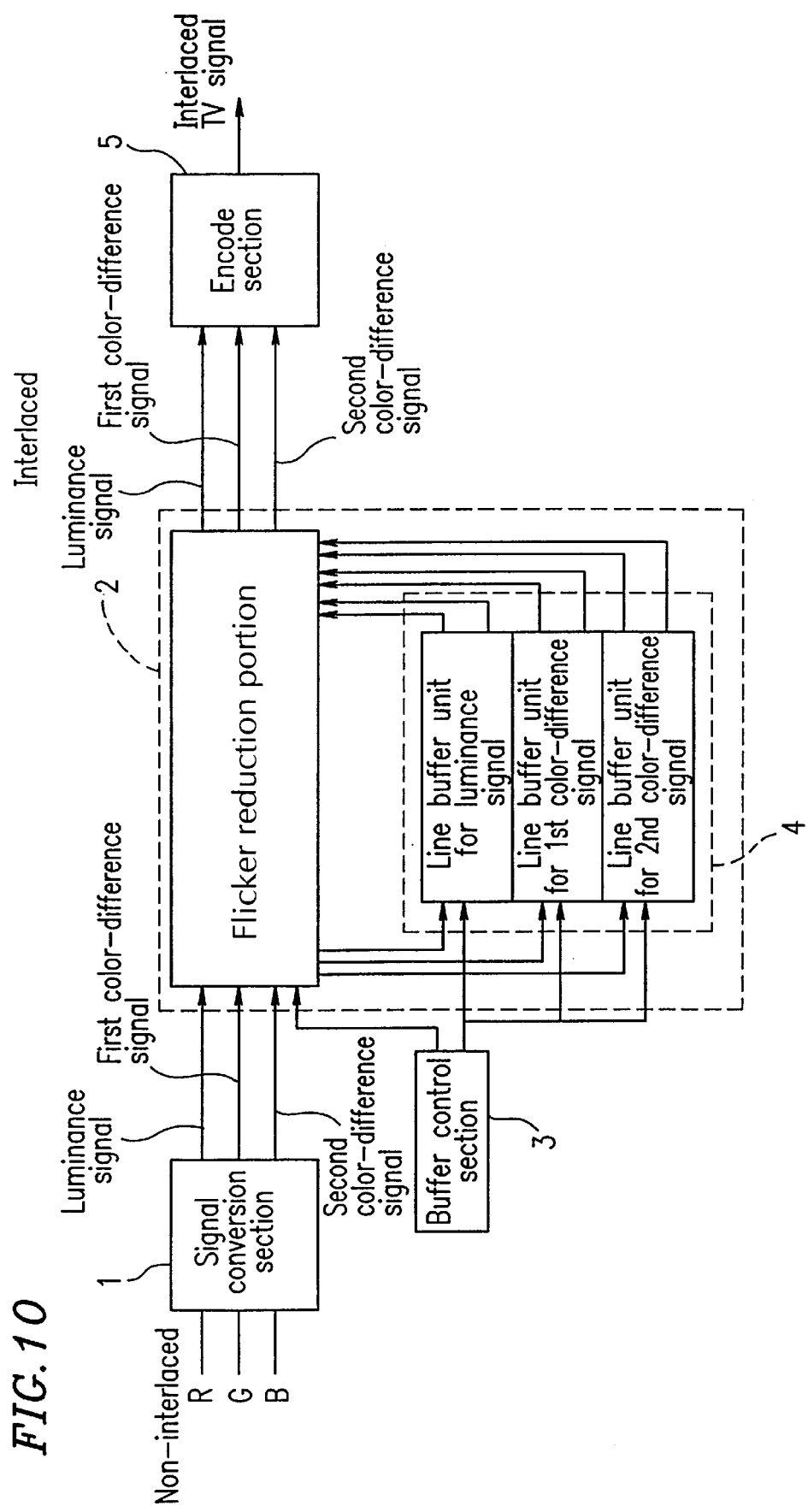
FIG. 10 is a diagram illustrating a another video signal conversion device configuration according to Example 1 of the present invention.

Regardless of the number of taps to be provided, the video signal conversion device of the present example may also take the configuration as illustrated in FIG. 10.

The configuration illustrated in FIG. 10 is basically the same as that illustrated in FIG. 1 except for the location where the signal conversion section 1 is provided. In the configuration illustrated in FIG. 10, the signal conversion section 1 is provided in a stage preceding the flicker reduction section 2.

In the video signal conversion device illustrated in FIG. 10, non-interlaced signals (including R, G and B signals) are first input to the signal conversion section 1, rather than to the flicker reduction section 2. Therefore, the signals input to the flicker reduction section 2 are not R, G and B signals of the non-interlaced signals but instead consist of one luminance signal and two color-difference signals. The flicker reduction section 2 then outputs one processed luminance signal and two processed color-difference signals of the interlaced signals. The signals are processed in the manner described above.

EXAMPLE 2

The video signal conversion device of Example 1 requires three line buffer units for processing one luminance signal and two color-difference signals. Hereinafter, a similar video signal conversion device which requires only two line buffer units will be described. Such a reduction in the number of line buffer units is realized by compressing by one-half the color-difference signal in the flicker reduction section before the color-difference signal is stored in the line buffer unit.

Example 2 utilizes the fact that a human eye is less sensitive to a color difference than it is to luminance. The color-difference data is compressed by one-half through a thinning process by removing every other one of the data values included in the color-difference signals.

Figure 11:
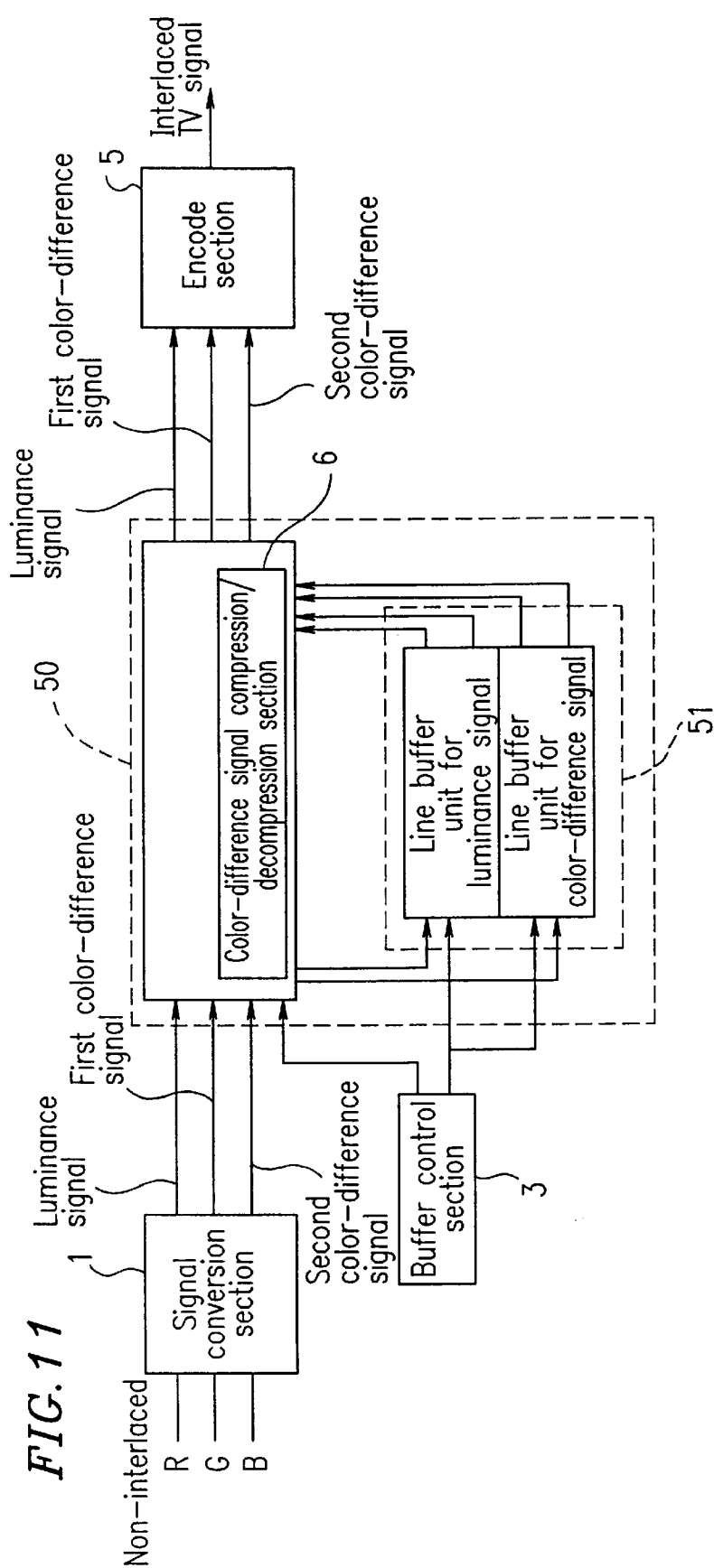
FIG. 11 is a diagram illustrating a video signal conversion device configuration according to Example 2 of the present invention.

FIG. 11 illustrates a configuration of a video signal conversion device according to Example 2 of the present invention. The configuration of the video signal conversion device illustrated in FIG. 11 is basically the same as that illustrated in FIG. 10 except for the configuration of the flicker reduction section. The video signal conversion device illustrated in FIG. 11 includes a signal conversion section 1, a flicker reduction section 50, a buffer control section 3 and an encode section 5. The flicker reduction section 50 is provided with a line buffer section 51 including two line buffer units and a color-difference signal compression/ decompression section 6.

The color-difference signal compression/decompression section 6 compresses two color-difference signals into data (for example, a single color-difference signal) and then writes the data in the line buffer section 51. Thereafter, the color-difference signal compression/decompression section 6 decompresses the compressed data read out from the line buffer section 51 into two color-difference signals. Due to this compression/decompression process, only one line buffer unit is required for storing the data relative to a color-difference signal.

The compression and decompression of the color-difference signal by the flicker reduction section 50 will be described with reference to FIG. 12.

FIG. 12 illustrates data which is input to, processed in, and output from, the flicker reduction section 50.

In synchronization with the input-side clock, sets of data (Y1, U1, V1), (Y2, U2, V2), (Y3, U3, V3), (Y4, U4, V4), . . . , are input to the flicker reduction section 50. Data Yx represents a luminance signal and data U1 and data V1 represent color-difference signals, respectively. The luminance signal data is stored in the line buffer section 51 in synchronization with a clock on the input side of the flicker reduction section 50. The color-difference signal data is thinned out by removing every other one of the data values thereof. In other words, the color-difference signal compression/decompression section 6 outputs the remaining data values to the line buffer unit of the line buffer section 51 in synchronization with the input-side clock. The remaining data values is stored in the line buffer unit of the line buffer section 51 in synchronization with the input-side clock.

As a result, data sets (Y1, U1), (Y2, V1), (Y3, U3), (Y4, V3), . . . are written in the line buffer units of the line buffer section 51, as illustrated in FIG. 12.

The data removed in the thinning process is restored by an appropriate interpolation process and then the remaining data values and the restored data are output from the flicker reduction section 50. For example, a linear interpolation process may be performed.

Since every other data value of the color-difference signal is removed in the thinning process, the number of line buffer units required for storing the data of the color-difference signals is reduced by one-half. Moreover, the number of circuits for multiplication, addition, division, etc., required for performing the non-interlaced/interlaced conversion process and the flicker reduction process can be reduced from that of Example 1.

Figure 13:
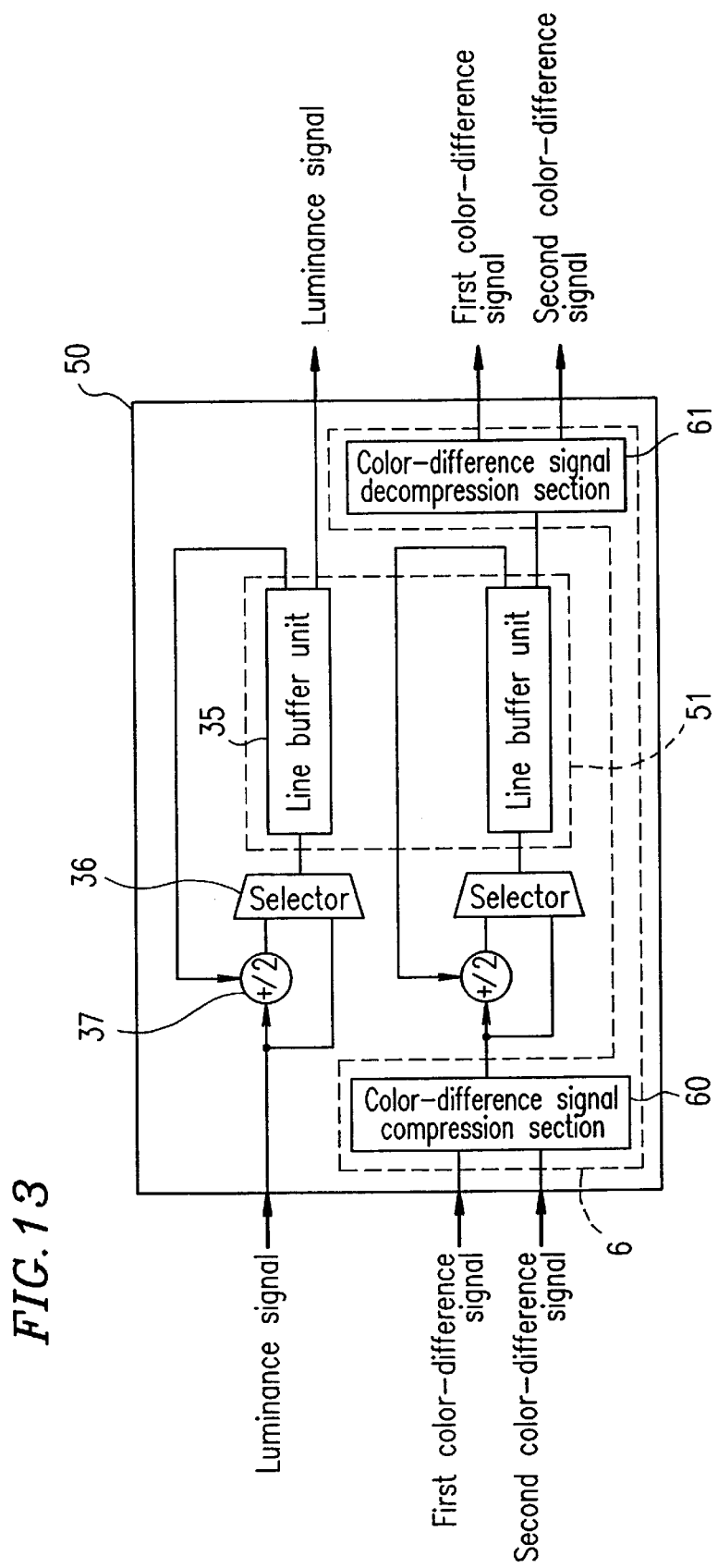
FIG. 13 is a diagram illustrating a line buffer unit configuration of FIG. 11.

FIG. 13 illustrates in detail a configuration of the flicker reduction section 50. The flicker reduction section 50 includes a line buffer section 51 (including a line buffer unit 35), a selector 36, an arithmetic unit 37 and a color-difference signal compression/decompression section 6 (including a color-difference signal compression section 60 and a color-difference signal decompression section 61). The color-difference signal compression section 60 thins out the data of the color-difference signal by removing every other data value of the color-difference signal. The color-difference signal decompression section 61 performs an interpolation process to restore the removed data as discussed above. The compression and decompression of the color-difference signal allow the number of line buffer units to be reduced.

Figure 22A:
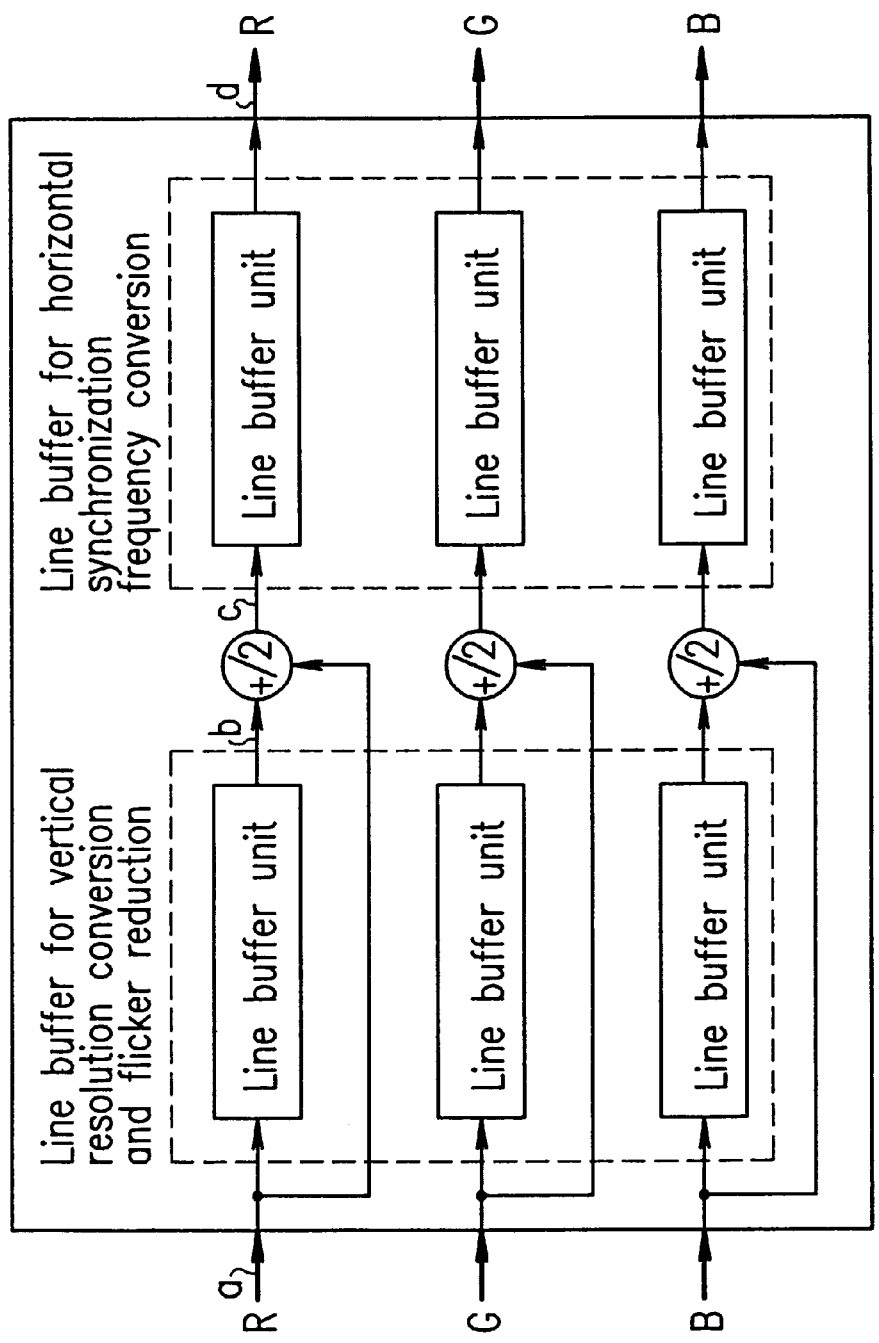
FIG. 22A is a diagram illustrating a conventional line buffer unit configuration.
Figure 23:
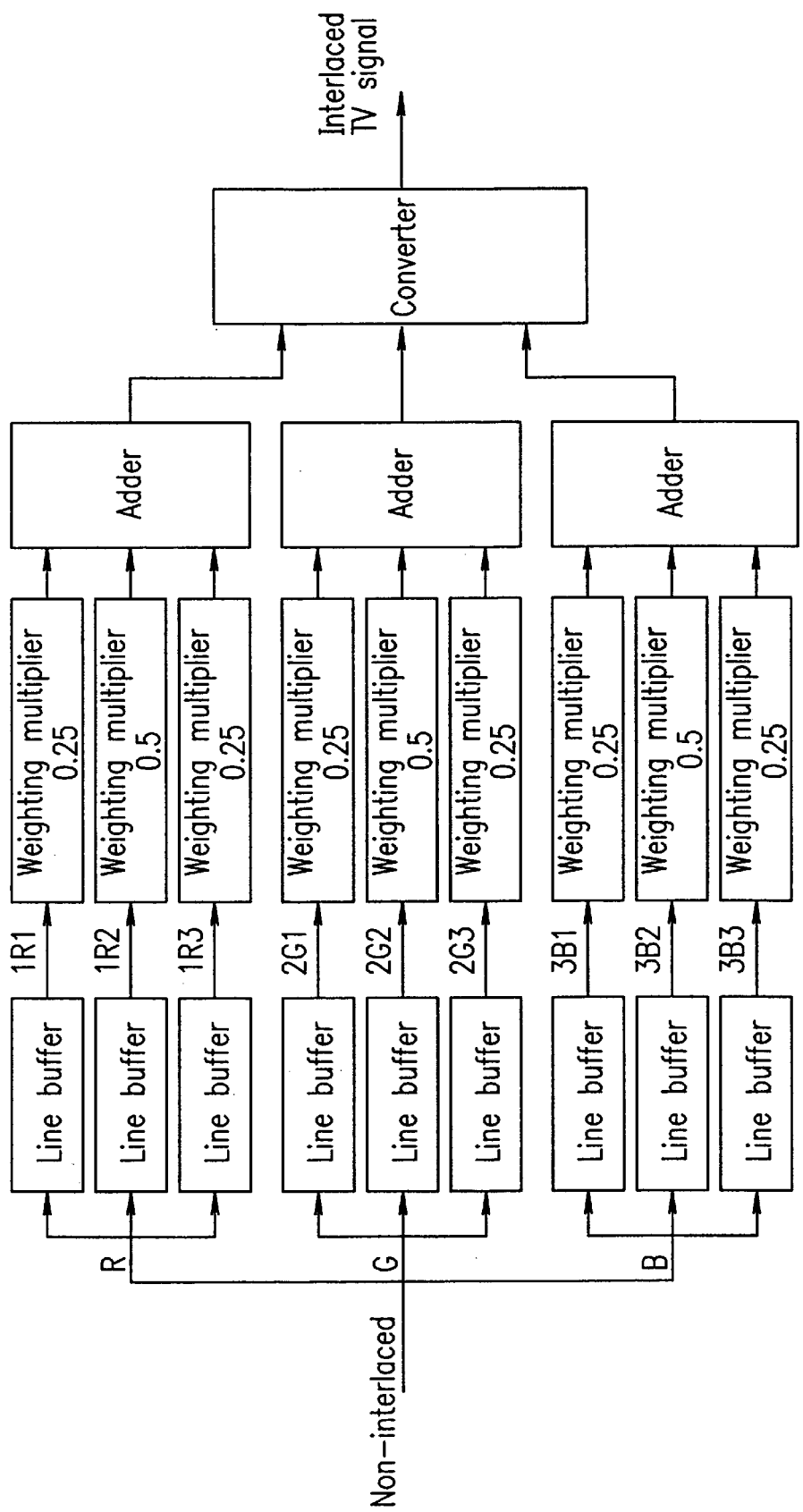
FIG. 23 is a diagram illustrating a conventional video signal conversion device configuration.

By performing the 2-tap flicker reduction process in accordance with Example 2, it is possible to reduce flicker with a line buffer capacity as small as ⅓ that required in the conventional video signal conversion device. An experiment was conducted for comparing the flicker reduction effect between the video signal conversion device of FIG. 22A and that of FIG. 11. There was hardly any difference therebetween in terms of the flicker reduction effect, the quality of the displayed images, and the like.

EXAMPLE 3

Figure 14:
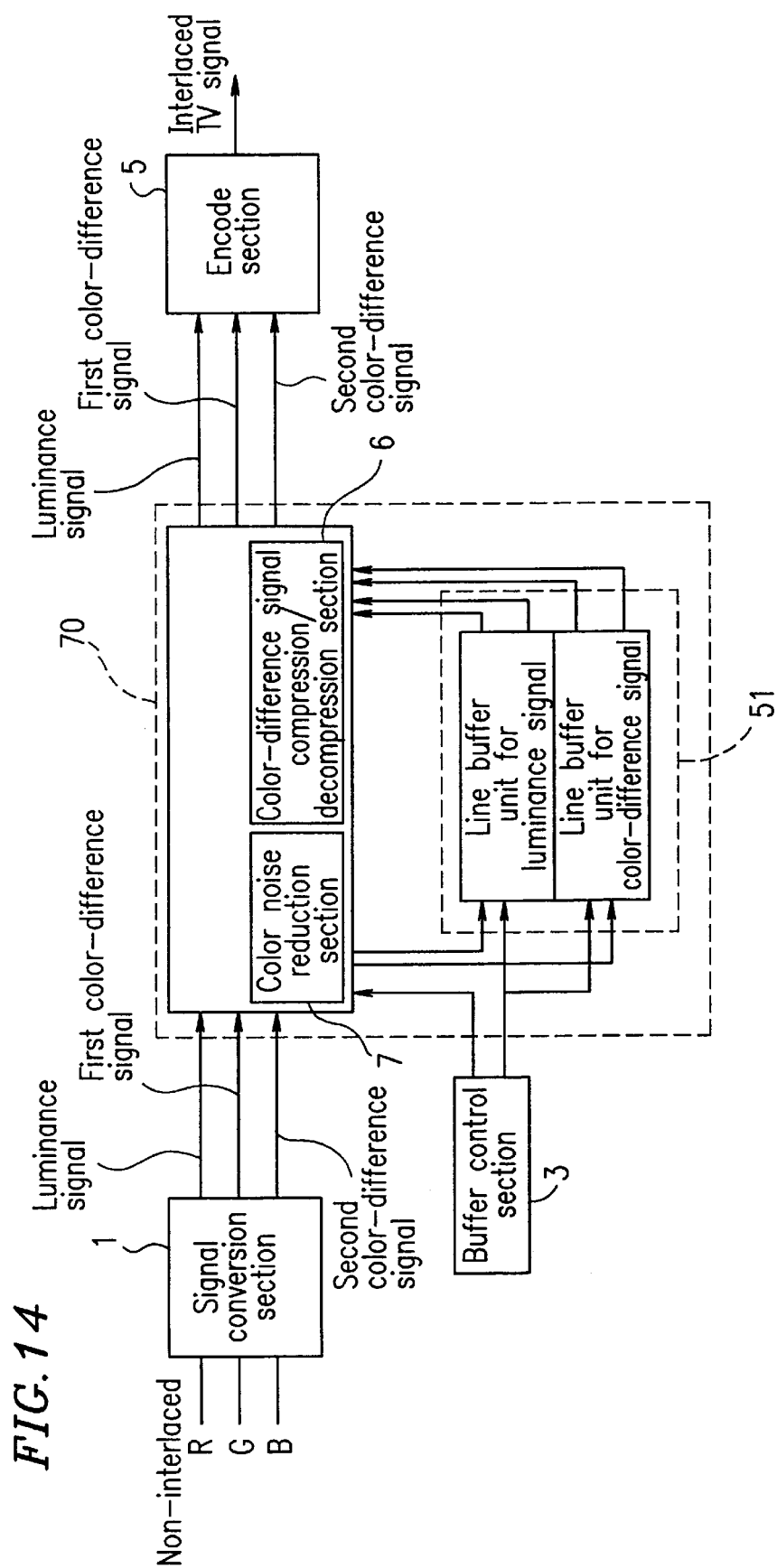
FIG. 14 is a diagram illustrating a video signal conversion device configuration according to Example 3 of the present invention.

FIG. 14 illustrates a configuration of a video signal conversion device according to Example 3 of the present invention. The video signal conversion device of FIG. 14 includes a signal conversion section 1, a flicker reduction section 70, a buffer control section 3 and an encode section 5. The configuration of the video signal conversion device illustrated in FIG. 14 is the same as that illustrated in FIG. 11 except for the configuration of the flicker reduction section.

Figure 15:
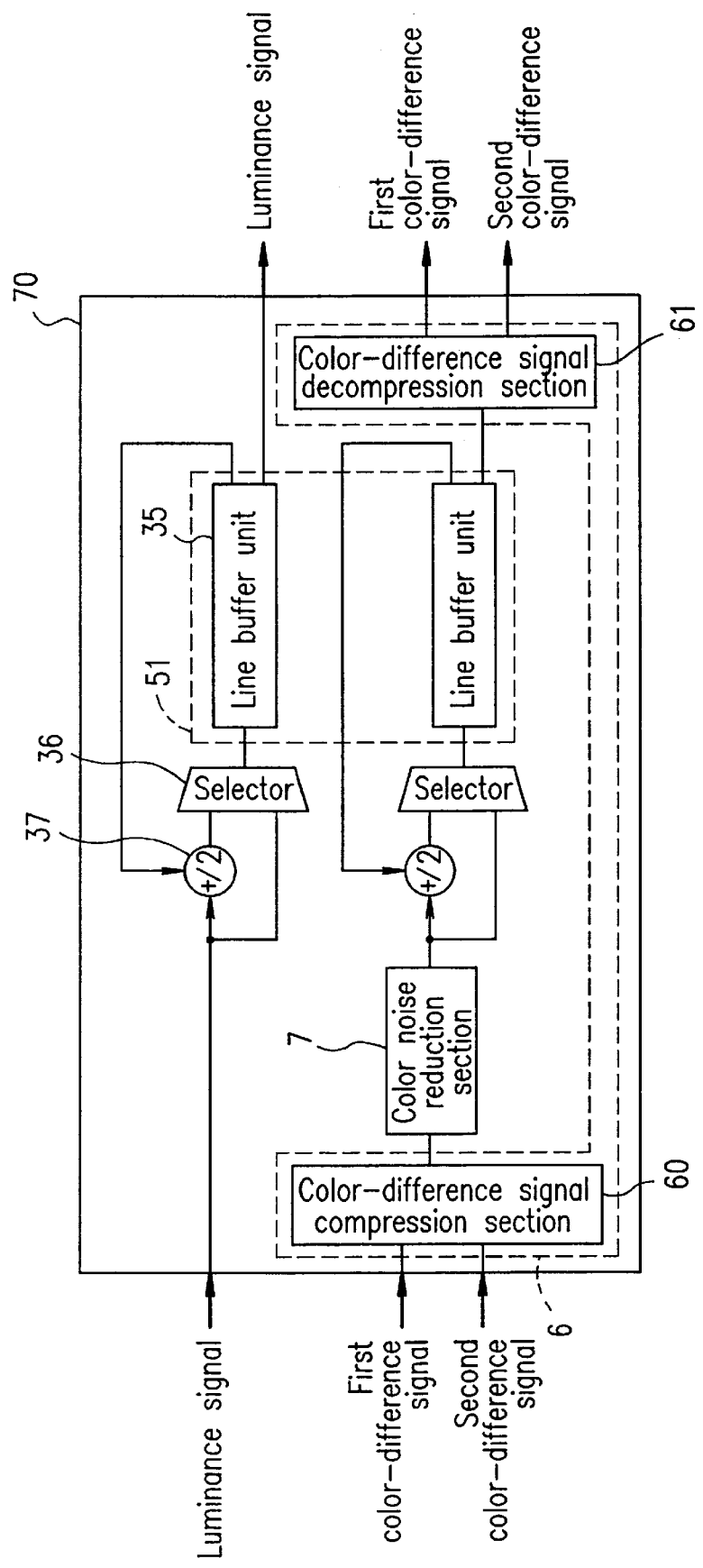
FIG. 15 is a diagram illustrating a line buffer unit configuration of FIG. 14.

FIG. 15 illustrates in detail an exemplary flicker reduction section 70 configuration. The flicker reduction section 70 is provided with a line buffer section 51 (including line buffer units 35), a color-difference signal compression/decompression section 6 (including a color-difference signal compression section 60 and a color-difference signal decompression section 61), a color noise reduction section 7, a selector 36 and an arithmetic unit 37.

The color noise reduction section 7 includes a low pass filter for reducing the color noise. A color-difference signal in the horizontal direction of the screen is filtered by the low pass filter of the color noise reduction section 7, thereby reducing the bleeding. In the flicker reduction section 70 illustrated in FIG. 15, the color noise reduction section 7 is provided in a stage subsequent to the color-difference signal compression section 60. According to Example 3, where the color noise reduction section 7 is provided, the noise carried in the image data can be reduced.

In the video signal conversion device illustrated in FIG. 14, the color noise reduction section 7 is provided in the flicker reduction section 70. However, the color noise reduction section 7 can be provided at any other location as long as it is provided after the signal conversion section 1 and before the encode section 5. This also contributes to improving the quality of the displayed image.

When the color noise reduction section 7 is provided in a stage subsequent to the color-difference signal compression section 60, the color noise reduction section 7 can be shared.

In order to effectuate at each clock a horizontal filter for the data of the first color-difference signal and the second color-difference signal, it is necessary to provide two horizontal filters, i.e., one for each color-difference signal.

In the color noise reduction section 7 which is provided in a stage subsequent to the color-difference signal compression section 60, every other color-difference data value can be regarded unnecessary, since it will be removed in a thinning process by the color-difference signal compression section 60 when compressing the data of the color-difference signal.

In other words, when the color noise reduction section 7 is provided in a stage subsequent to the color-difference signal compression section 60, the color noise can be reduced with one horizontal filter by effectuating the horizontal filter at each clock alternately for the data of the first color-difference signal and for the data of the second color-difference signal.

EXAMPLE 4

A 3-tap video signal conversion device according to Example 4 of the present invention will be described with reference to FIG. 16.

Figure 16:
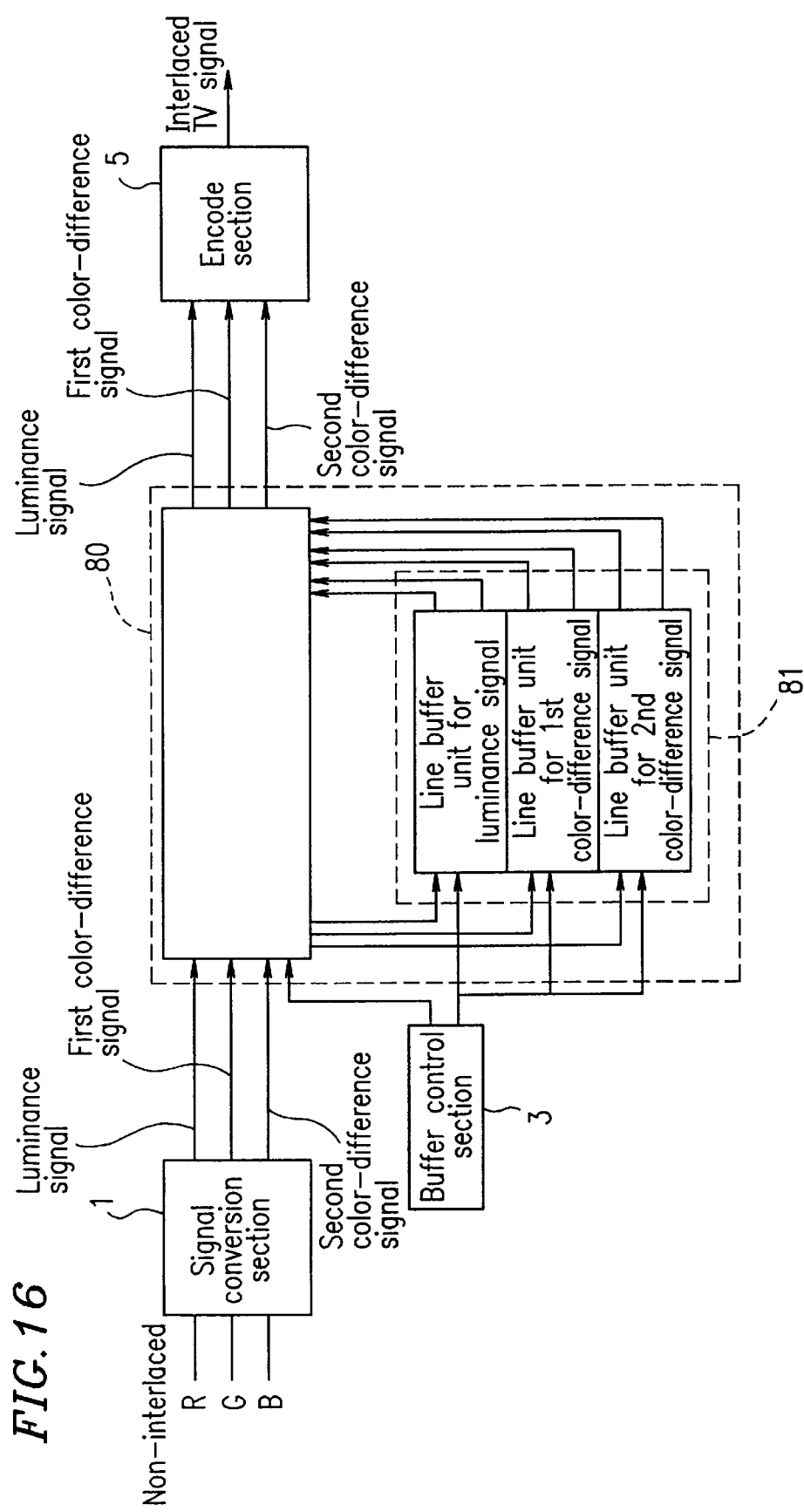
FIG. 16 is a diagram illustrating a video signal conversion device configuration according to Example 4.

FIG. 16 illustrates a configuration of the video signal conversion device according to Example 4 of the present invention. The configuration of the video signal conversion device of FIG. 16 is basically the same as that of the device illustrated in FIG. 10 except for the configuration of the flicker reduction section. The video signal conversion device of FIG. 16 includes a signal conversion section 1, a flicker reduction section 80, a buffer control section 3 and an encode section 5.

Figure 17:
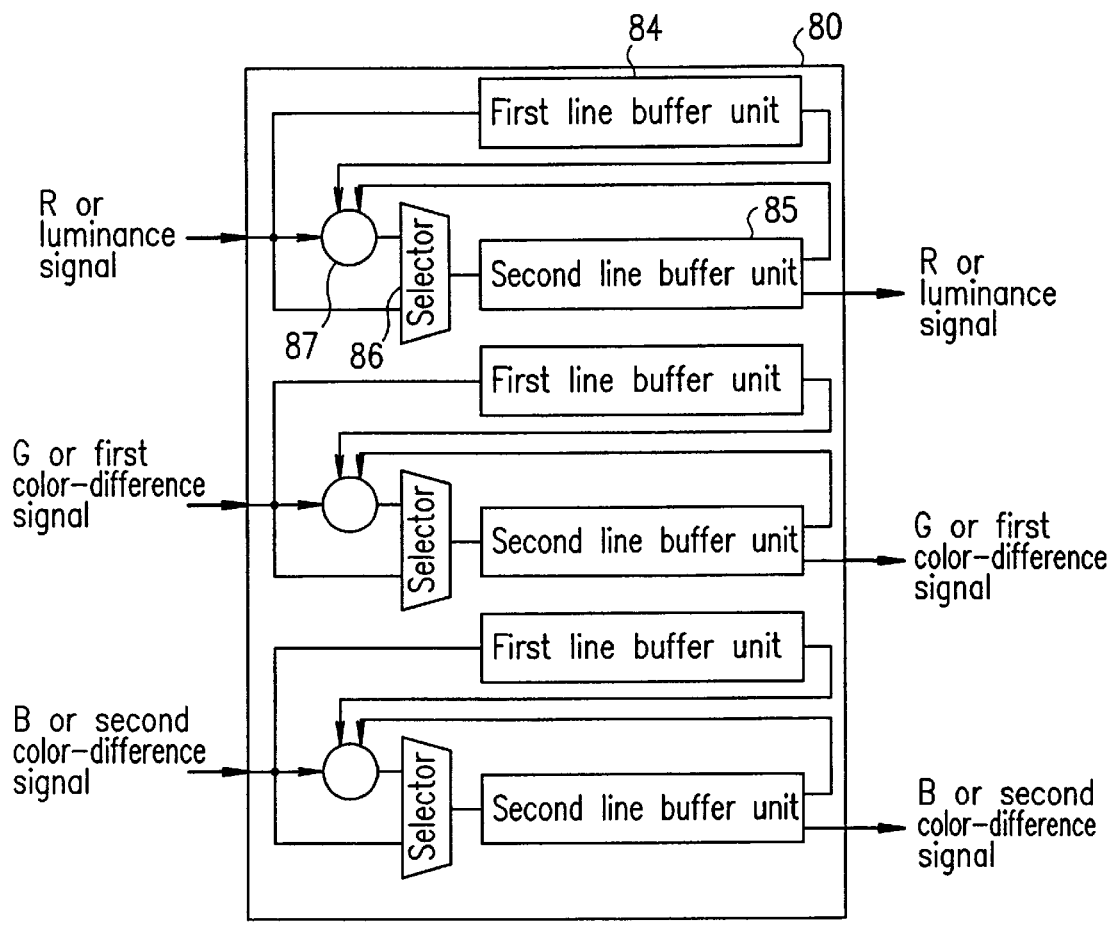
FIG. 17 is a diagram illustrating an exemplary flicker reduction section 80 configuration.

An exemplary configuration of the flicker reduction section 80 will be described with reference to FIG. 17. The flicker reduction section 80 of FIG. 17 includes a first line buffer unit 84, a second line buffer unit 85, a selector 86 which is electrically connected to the second line buffer unit 85, and an arithmetic unit 87 for calculating the average value of the input signals.

Hereinafter, the flicker reduction process according to Example 4 will be described. FIGS. 18A and 18B illustrate an exemplary process for simultaneously performing non-interlaced/interlaced conversion and flicker reduction.

The flicker reduction process in an odd-numbered field will be described with reference to FIG. 18A.

When the first line L1 of a non-interlaced input signal is input to the flicker reduction section 80, the data of the first line is stored in the second line buffer unit 85. Then, when the second line L2 of the non-interlaced input signal is input, a weighted average of the data of the first line L1, stored in the second line buffer unit 85, and the data of the second line L2 is calculated. The calculation result is output as the first line L1' of the interlaced output signal, while simultaneously storing the data of the second line L2 in the first line buffer unit 84. Since there is not line L0, the uppermost line in the odd-numbered field is obtained from two lines, instead of three lines.

As the third line L3 of the non-interlaced input signal is input, the data of the third line L3 is stored in the second line buffer unit 85. When the fourth line L4 of the non-interlaced input signal is input, the weighted average value of the data of the second line L2 (stored in the first line buffer unit 84), the data of the third line L3 (in the second line buffer unit 85) and the data of the fourth line L4 is calculated. The calculation result is output as the second line L2' of the interlaced output signal, while the data of the fourth line L4 is stored in the first line buffer unit 84.

As the fifth line L5 of the non-interlaced input signal is input, the data of the fifth line L5 is stored in the second line buffer unit 85. When the sixth line L6 of the non-interlaced input signal is input, the weighted average value of the data of the fourth line L4 (stored in the first line buffer unit 84), the data of the fifth line L5 (stored in the second line buffer unit 85) and the data of the sixth line L6 is calculated. The calculation result is output as the third line L3' of the interlaced output signal, while the data of the sixth line L6 is stored in the first line buffer unit 84.

Hereinafter, the flicker reduction process in an even-numbered field will be described with reference to FIG. 18B.

As the first line L1 of the non-interlaced input signal is input, the data of the first line L1 is stored in the first line buffer unit 84. As the second line L2 of the non-interlaced input signal is input, the data of the second line L2 is stored in the second line buffer unit 85. As the third line L3 of the non-interlaced input signal is input, the weighted average value of the data of the first line L1 (stored in the first line buffer unit 84), the data of the second line L2 (stored in the second line buffer unit 85) and the data of the third line is calculated. The calculation result is output as the first line L" of the interlaced output signal, while the data of the third line L3 is stored in the first line buffer unit 84.

As the fourth line L4 of the non-interlaced input signal is input, the data of the fourth line L4 is stored in the second line buffer unit 85. As the fifth line L5 of the non-interlaced input signal is input, the weighted average value of the data of the third line L3 (stored in the first line buffer unit 84), the data of the fourth line L4 (stored in the second line buffer unit 85) and the data of the fifth line is calculated. The calculation result is output as the second line L2" of the interlaced output signal, while the data of the fifth line L5 is stored in the first line buffer unit 84.

As described above, the interlaced signal corresponding to the uppermost line L1' in the odd-numbered field is obtained from the non-interlaced signals corresponding to the uppermost line L1 and the next line L2. The buffer control section 3 controls the arithmetic unit 87 so that the weighting coefficient for the line L1 is 2, the weighting coefficient for the line L2 is 1, and the divisor by which the sum of the lines weighted for obtaining the weighted average is divided is 3.

The interlaced signals corresponding to the lines Lx' other than the line L1' in the odd-numbered field are obtained from the non-interlaced signals corresponding to the lines L2x−2, L2x−1 and L2x (x denotes an integer of 2 or greater). The buffer control section 3 controls the arithmetic unit 87 so that the weighting coefficient for the line L2x−2 is 1, the weighting coefficient for the line L2x is 2, the weighting coefficient for the line L2x+1 is 1, and the divisor by which the sum of the lines weighted for obtaining the weighted average is divided is 4.

The interlaced signals corresponding to the lines Lx" in the even-numbered field are obtained from the non-interlaced signals corresponding to the lines L2x−1, L2x and L2x+1 (x denotes a natural number). The buffer control section 3 controls the arithmetic unit 87 so that the weighting coefficient for the line L2x−1 is 1, the weighting coefficient for the line L2x is 2, the weighting coefficient for the line L2x+1 is 1, and the divisor by which the sum of the lines weighted for obtaining the weighted average is divided is 4.

Instead of controlling the arithmetic unit 87 by the buffer control section 3, the weighting coefficient and the divisor may alternatively be directly determined based on the non-interlaced signals corresponding to the lines input to the arithmetic unit 87.

Thus, either in an odd-numbered field or in an even-numbered field, a weighted average value of three lines input in the non-interlaced mode is calculated and used for one line of an interlaced signal for television. In this way, in either field, three lines are processed into one line, and the difference in luminance between two adjacent scanning lines, which can cause the flicker noise, is reduced. Through the above-described process, the number of lines in one screen can be reduced by one-half.

Figure 19:
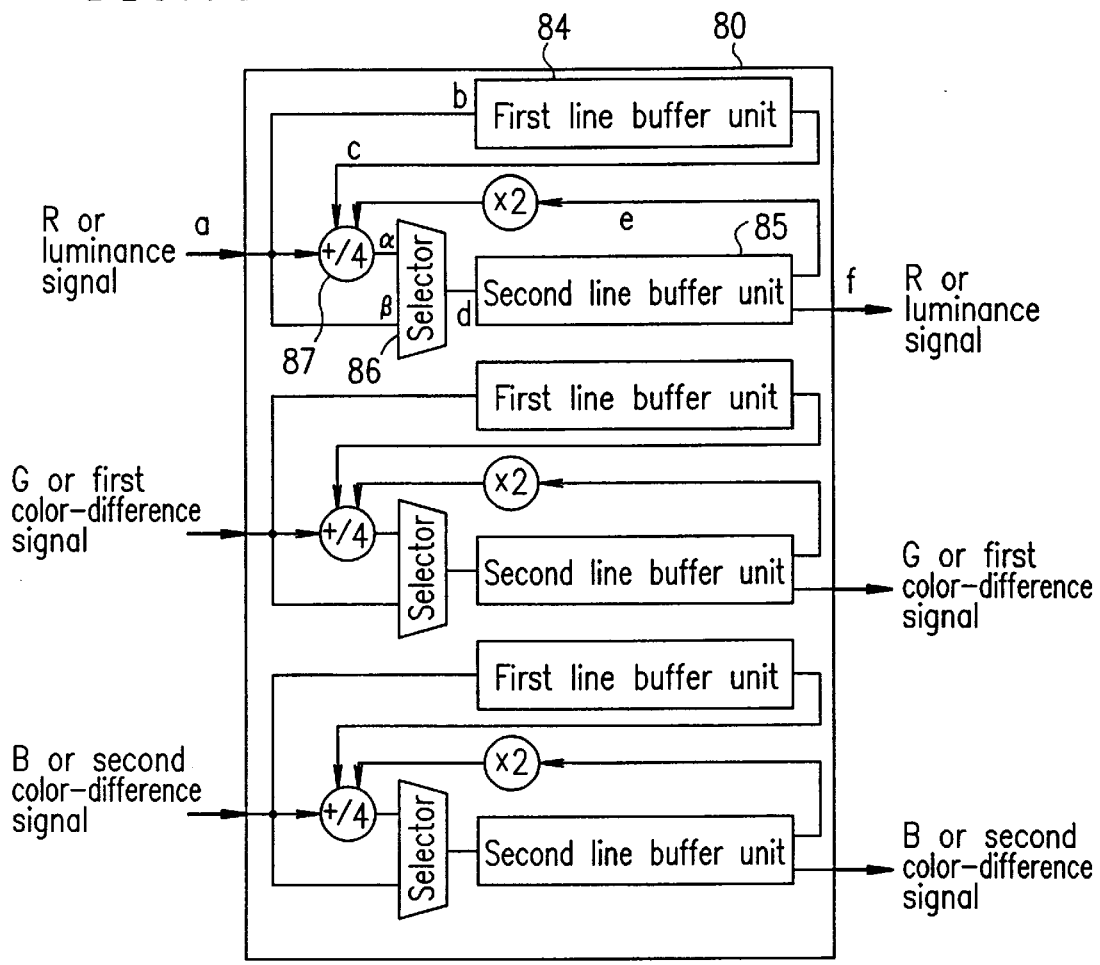
FIG. 19 is a diagram illustrating an exemplary configuration of the flicker reduction section 80.
Figure 20:
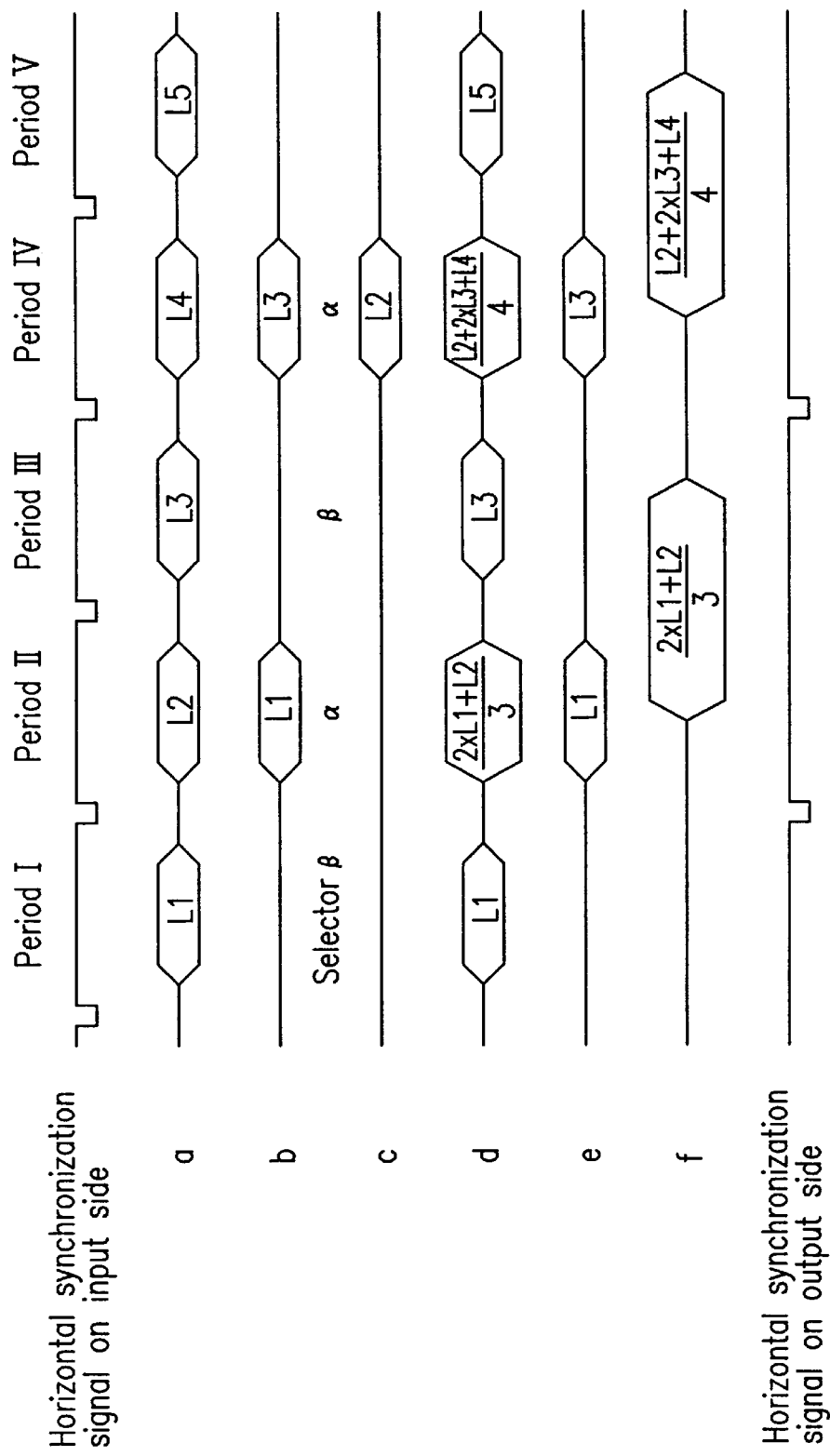
FIG. 20 illustrates signal timing diagrams at points a, b, c, d, e and f in the flicker reduction section 80 of FIG. 19.

Implementation of the horizontal synchronization frequency conversion using the same line buffer will be described with reference to FIGS. 19 and 20. FIG. 19 illustrates a configuration of the flicker reduction section 80 of FIG. 17 where the weighting coefficient is 2. FIG. 20 illustrates signal timing diagrams at points a, b, c, d, e and f in the flicker reduction section 80.

During period I, the data of the first line L1 of the non-interlaced input signal is written in the second line buffer unit 85 in synchronization with the horizontal synchronization signal on the input side. In this case, the selector 86 selects a signal from port β so that the data of the first line L1 is written in the second line buffer unit 85.

During period II, in synchronization with the horizontal synchronization signal on the input side, the data of the second line L2 of the non-interlaced input signal is input. The data of the second line L2 and the data of the first line L1, which has been written in the second line buffer unit 85, are averaged by the arithmetic unit 87. The averaged value is written in the second line buffer unit 85 in synchronization with the horizontal synchronization signal on the input side. In this case, the selector 86 selects a signal from port β so that the weighted average value of the data input to the flicker reduction section 2 and the data written in the second line buffer unit 85 is written in the second line buffer unit 85. Moreover, the data of the second line L2 is written in the first line buffer unit 84. In the weighted averaging of data, a coefficient is applied to the data, so as to intensify a component of the data which is multiplied by the coefficient.

During periods II and III, the weighted average data, which has been written in the second line buffer unit 85, is output to a subsequent processing section in synchronization with the horizontal synchronization signal on the output side, which has been obtained by dividing in half the clock frequency of the horizontal synchronization signal on the input side. The time at which this data is output is before the data of the third line L3 of the non-interlaced input signal is written in the second line buffer unit 85.

The data of the third line L3 of the non-interlaced input signal is written in the second line buffer unit 85 during period III in synchronization with the horizontal synchronization signal on the input side.

During period IV, the data of the fourth line L4 of the non-interlaced input signal is input in synchronization with the horizontal synchronization signal of the input side. Then, a calculation is performed to obtain a weighted average value of: the data of the fourth line L4; the data of the second line L2 (stored in the first line buffer unit 84); and a value obtained by doubling the data value of the third line L3 (stored in the second line buffer unit 85). The calculation result is written in the second line buffer unit 85. In this case, the selector 86 selects a signal from port α so that the weighted average value of the data input to the flicker reduction section 2 and the data written in the second line buffer unit 85 is written in the second line buffer unit 85. The data of the fourth line L4 is written in the first line buffer unit 84.

During periods IV and V, the weighted average data, which has been written in the second line buffer unit 85, is output to a subsequent processing section in synchronization with the horizontal synchronization signal on the output side, which has been obtained by dividing in half the clock frequency of the horizontal synchronization signal on the input side. The time at which this data is output is before the data of the fifth line L5 of the non-interlaced input signal is written in the second line buffer unit 85.

As described above, a clock for an interlaced output signal is obtained by dividing the clock frequency (horizontal synchronization signal) of the non-interlaced input signal in half. The flicker-reduced data is read out from the second line buffer 85 in synchronization with the frequency-divided clock, thereby converting the horizontal synchronization frequency. In this way the flicker reduction section performs the non-interlaced/interlaced conversion and the flicker reduction process.

Figure 21:
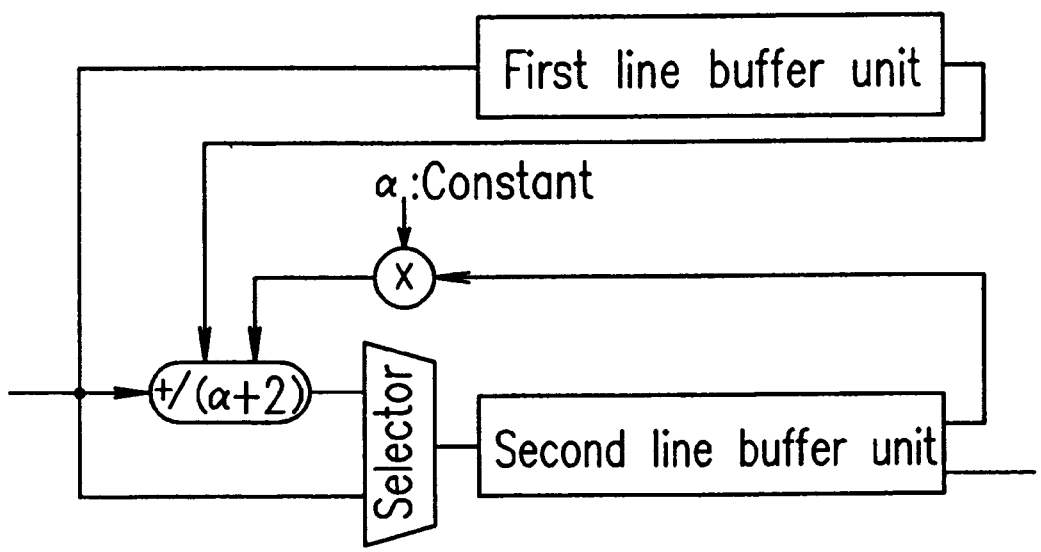
FIG. 21 is a diagram illustrating a portion of a flicker reduction section.

The weighting coefficient for the data of the flicker reduction section 80, as illustrated in FIG. 19 is 1:2:1, though not limited thereto. FIG. 21 illustrates another configuration of the flicker reduction section, which adds together: the data read out from the first line buffer unit 84; the data obtained by multiplying the data read out from the second line buffer 85 by a constant α; and the data of the input line. Thereafter the addition result is divided by the value "α+2". By varying the constant α, it is possible to adjust the flicker reduction rate and the vertical resolution.

As a variation of Example 4, the flicker reduction section 80 may be provided at a stage subsequent to the signal conversion section 1. The data processing procedure will still be the same as in Example 4 except for the input/output signals are not the RGB signals but rather include one luminance signal and two color-difference signals.

In Example 4, three line buffer units are required for processing the luminance signal and the color-difference signals. Example 4 may be modified so as to compress by one-half the color-difference signal in the flicker reduction section and store the compressed color-difference signal in a line buffer unit, thereby eliminating one of the line buffer units, as illustrated in Example 2. In this way, the total number of line buffer units required can be reduced from six to four.

The video signal conversion device of the present invention is provided with a flicker reduction section for inverting a non-interlaced signal to an interlaced signal and for reducing flicker. Thus, the video signal conversion device of the present invention is capable of performing non-interlaced/interlaced conversion.

The flicker reduction section includes a line buffer. The line buffer includes an input port for inputting data and two output ports for outputting data. The line buffer is capable of storing a data value in accordance with the address thereof and, independently, reading out two data values corresponding to two addresses. Thus, it is possible to reduce the number of line buffers, the size of the device, the cost of the device, and the power consumption of the device from those of the conventional video signal conversion device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video signal conversion device, comprising a flicker reduction section including a plurality of line buffers for storing data in accordance with an address thereof, the flicker reduction section receiving non-interlaced signals, converting the non-interlaced signals to interlaced signals and performing a flicker reduction process, wherein at least one of the line buffers includes an input port for inputting data and two output ports for outputting data, and wherein the at least one line buffer is capable of storing a data value in accordance with an address thereof and, independently, reading out two data values corresponding to two addresses.

2. A video signal conversion device according to claim 1, wherein the non-interlaced signals include RGB signals.

3. A video signal conversion device according to claim 1, wherein the non-interlaced signals include a luminance signal, a first color-difference signal and a second color-difference signal.

4. A video signal conversion device according to claim 1, further comprising a signal conversion section for converting RGB signals to a luminance signal, a first color-difference signal and a second color-difference signal, wherein the flicker reduction section receives the luminance signal, the first color-difference signal and the second color-difference signal output from the signal conversion section.

5. A video signal conversion device according to claim 4, wherein the flicker reduction section includes a color-difference signal compression and decompression section for compressing and decompressing the first color-difference signal and the second color-difference signal.

6. A video signal conversion device according to claim 5, wherein:

the color-difference signal compression and decompression section thins out the first color-difference signal by removing alternating data values of the first color-difference signal arranged serially in a time domain and outputting the remaining data values of the first color-difference signal to one of the line buffers, and thins out the second color-difference signal by removing alternating data values of the second color-difference signal arranged serially in a time domain and outputting the remaining data values of the second color-difference signal to the one of the line buffers, thereby compressing the first and second color-difference signals; and the color-difference signal compression and decompression section decompresses the compressed color-difference signal by linearly interpolating the removed data values using the remaining data values.

7. A video signal conversion device according to claim 1, further comprising a color noise reduction section for reducing color noise.

8. A video signal conversion device according to claim 1, wherein the flicker reduction process is performed by addition and averaging.

9. A video signal conversion device according to claim 1, further comprising a control section for controlling a writing of data in the at least one line buffer and for controlling a reading out of data stored in the at least one line buffer.

10. A video signal conversion device according to claim 1, wherein:

the non-interlaced signals include RGB signals;

the flicker reduction section converts the non-interlaced RGB signals to interlaced RGB signals; and the video signal conversion device further comprises a signal conversion section for converting the interlaced RGB signals output from the flicker reduction section to a luminance signal, a first color-difference signal and a second color-difference signal.

11. A video signal conversion device according to claim 2, wherein the RGB signals include signals output from a computer.

12. A video signal conversion device according to claim 1, wherein:

the non-interlaced signal includes first data of a first line and second data of a second line; and the line buffer calculates an average value of the first data and the second data.

13. A video signal conversion device according to claim 1, wherein:

the non-interlaced signal includes first data of a first line and second data of a second line; and the line buffer calculates a weighted average value of the first data and the second data.

14. A video signal conversion device according to claim 1, wherein:

the non-interlaced signal includes first data of a first line, second data of a second line and third data of a third line; and the line buffer calculates an average value of the first data, the second data and the third data.

15. A video signal conversion device according to claim 1, wherein:

the non-interlaced signal includes first data of a first line, second data of a second line and third data of a third line; and the line buffer calculates a weighted average value of the first data, the second data and the third data.

* * * * *